(12) United States Patent
Uyeki

(10) Patent No.: US 12,380,743 B2
(45) Date of Patent: Aug. 5, 2025

(54) VEHICLE-BATTERY STATE-OF-CHARGE (SOC)-BASED TRANSMISSION OF TELEMATICS DATA

(71) Applicant: Honda Motor Co., Ltd., Tokyo (JP)

(72) Inventor: Robert M Uyeki, Torrance, CA (US)

(73) Assignee: Honda Motor Co., Ltd., Tokyo (JP)

(*) Notice: Subject to any disclaimer, the term of this patent is extended or adjusted under 35 U.S.C. 154(b) by 284 days.

(21) Appl. No.: 18/323,617

(22) Filed: May 25, 2023

(65) Prior Publication Data

US 2024/0395078 A1   Nov. 28, 2024

(51) Int. Cl.
| | | |
|---|---|---|
| G07C 5/00 | (2006.01) | |
| B60L 58/12 | (2019.01) | |
| G07C 5/08 | (2006.01) | |

(52) U.S. Cl.
CPC .............. G07C 5/008 (2013.01); B60L 58/12 (2019.02); G07C 5/0808 (2013.01); G07C 5/0825 (2013.01)

(58) Field of Classification Search
CPC .... G07C 5/008; G07C 5/0808; G07C 5/0825; B60L 58/12; B60L 53/67; B60L 53/68; B60L 2250/16
See application file for complete search history.

(56) References Cited

U.S. PATENT DOCUMENTS

| | | | |
|---|---|---|---|
| 9,731,615 B2 | 8/2017 | Uyeki et al. | |
| 9,989,373 B2 | 6/2018 | Uyeki | |
| 11,498,452 B2* | 11/2022 | O'Gorman | B60L 53/665 |
| 2014/0354227 A1* | 12/2014 | Tyagi | B60L 53/63 320/109 |
| 2016/0159229 A1* | 6/2016 | Enomoto | B60L 58/12 320/109 |
| 2019/0111939 A1* | 4/2019 | Ulrey | B60K 6/442 |
| 2019/0299794 A1* | 10/2019 | Sworski | B60L 53/665 |
| 2021/0094438 A1* | 4/2021 | Ciccone | B60L 58/24 |
| 2021/0138928 A1* | 5/2021 | O'Gorman | B60L 50/50 |
| 2021/0284039 A1* | 9/2021 | Ando | H04W 4/44 |

(Continued)

FOREIGN PATENT DOCUMENTS

| | | | | |
|---|---|---|---|---|
| DE | 102020125311 A1 * | 4/2021 | ........... | B60L 3/0046 |
| EP | 3709253 A1 | 9/2020 | | |

(Continued)

*Primary Examiner* — Mary Cheung
(74) *Attorney, Agent, or Firm* — Aaron Fong; American Honda Motor Co., Inc.

(57) ABSTRACT

A system and a method for vehicle-battery state-of-charge (SOC)-based transmission of telematics data are provided. The system comprises a control circuitry. The control circuitry receives a threshold value corresponding to a predefined state-of-charge of a battery of a vehicle. The control circuitry monitors a state-of-charge of the battery of the vehicle. The control circuitry determines whether the monitored state-of-charge of the battery of the vehicle exceeds the received threshold value. The control circuitry determines telematics data associated with the vehicle based on the determination that the monitored state-of-charge of the battery of the vehicle exceeds the received threshold value. The control circuitry transmits the determined telematics data associated with the vehicle. The control circuitry controls rendering of the transmitted telematics data on a display device.

15 Claims, 11 Drawing Sheets

(56) References Cited

U.S. PATENT DOCUMENTS

| | | |
|---|---|---|
| 2022/0258638 A1 | 8/2022 | Harirchi et al. |
| 2022/0363140 A1 | 11/2022 | Dayal et al. |
| 2022/0410750 A1 | 12/2022 | Mangal et al. |
| 2023/0044046 A1* | 2/2023 | Neuenschwander ........................ G05B 13/048 |

FOREIGN PATENT DOCUMENTS

| | | |
|---|---|---|
| IN | 202111009351 A | 10/2022 |
| WO | WO-2024211440 A1 * | 10/2024 |

* cited by examiner

VEHICLE-BATTERY STATE-OF-CHARGE (SOC)-BASED TRANSMISSION OF TELEMATICS DATA

BACKGROUND

Advancements in the fields of electronics and electrical technology have led to development of electric vehicles (EVs). The EV may include an electrical motor that may derive electrical power from a rechargeable battery. The rechargeable battery may need to be charged from a charging station. The charging station may include a public charging station, home charging station, an office charging station, and the like. With an increasing focus on techniques for reduction of carbon emissions from conventional vehicles, demand for EVs is increasing. Therefore, a demand for charging stations may also increase. In order to meet the demand for charging stations, a requirement for a number of charging stations may need to be known in each location of a plurality of locations.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a system is provided. The system may include a control circuitry. The control circuitry may transmit, to a set of vehicles, a threshold value corresponding to a predefined state-of-charge of a battery of a vehicle. The control circuitry may control, each vehicle of the set of vehicles, to monitor a state-of-charge of the battery of the corresponding vehicle of the set of vehicles. The control circuitry may control, each vehicle of the set of vehicles, to determine whether the monitored state-of-charge of the battery of the corresponding vehicle, of the set of vehicles, exceeds the transmitted threshold value. The control circuitry may control, each vehicle of the set of vehicles, to determine telematics data associated with the corresponding vehicle of the set of vehicles, based on the determination that the monitored state-of-charge of the battery of the corresponding vehicle exceeds the transmitted threshold value. The control circuitry may receive the determined telematics data associated with the corresponding vehicle of the set of vehicles from each vehicle of the set of vehicles. The control circuitry may analyze the telematics data received from each vehicle, of the set of vehicles, to determine statistical information related to the analyzed telematics data. The control circuitry may control rendering of the determined statistical information related to the analyzed telematics data on a display device.

According to another embodiment of the disclosure, a system is provided. The system may include a control circuitry. The control circuitry may receive a threshold value corresponding to a predefined state-of-charge of a battery of a vehicle. The control circuitry may monitor a state-of-charge of the battery of the vehicle. The control circuitry may determine whether the monitored state-of-charge of the battery of the vehicle exceeds the received threshold value. The control circuitry may determine telematics data associated with the vehicle based on the determination that the monitored state-of-charge of the battery of the vehicle exceeds the received threshold value. The control circuitry may transmit the determined telematics data associated with the vehicle. The control circuitry may control rendering of the transmitted telematics data on a display device.

According to another embodiment of the disclosure, a method in a system is provided. The method may include reception of a threshold value corresponding to a predefined state-of-charge of a battery of a vehicle. The method may further include monitoring a state-of-charge of the battery of the vehicle. The method may further include determining whether the monitored state-of-charge of the battery of the vehicle exceeds the received threshold value. The method may further include determination of telematics data associated with the vehicle based on the determination that the monitored state-of-charge of the battery of the vehicle exceeds the received threshold value. The method may further include transmission of the determined telematics data associated with the vehicle. The method may further include controlling rendering of the transmitted telematics data on a display device.

Figure 1:
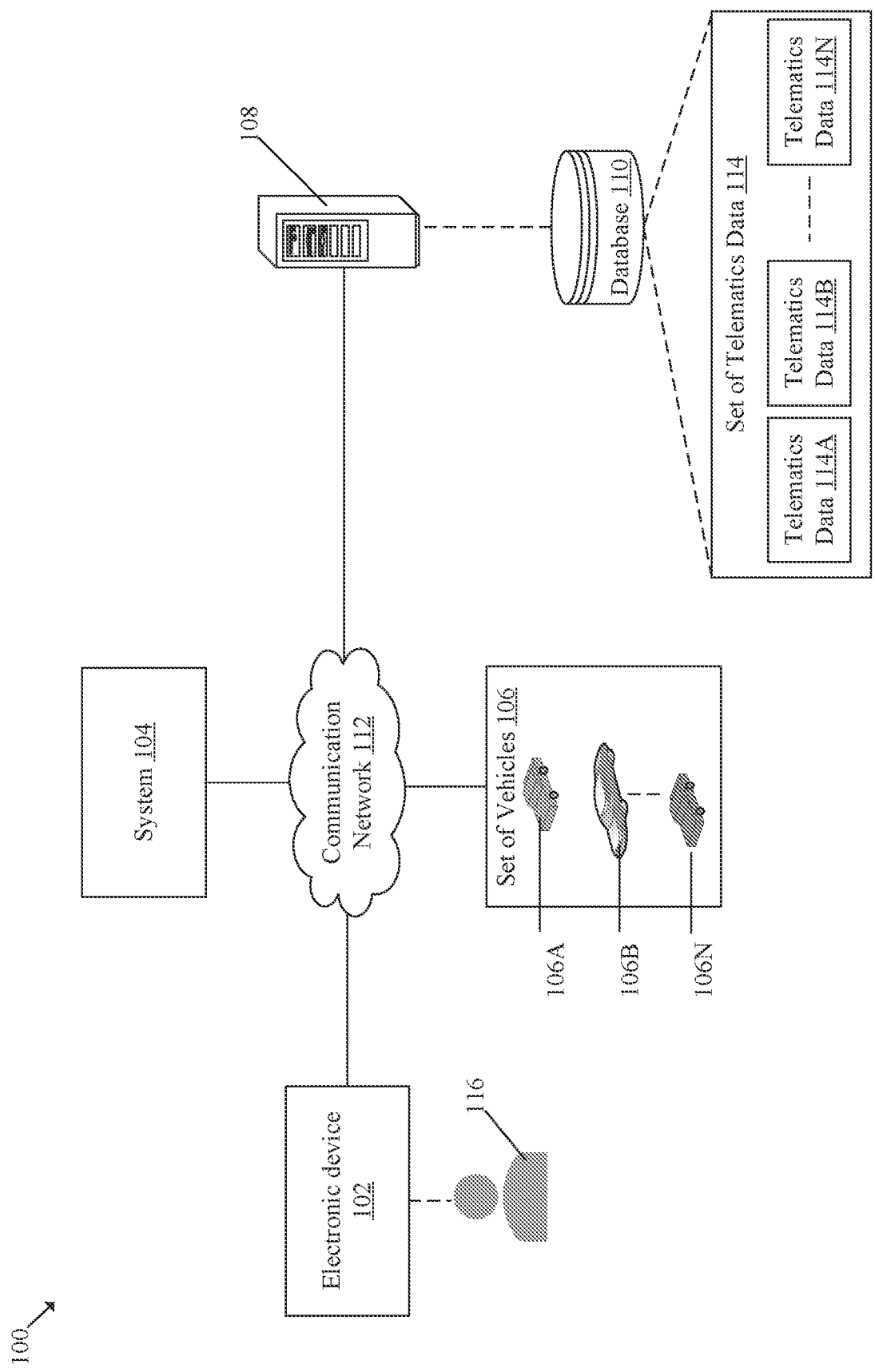
FIG. 1 is a block diagram that illustrates an exemplary network environment for vehicle-battery state-of-charge (SOC)-based transmission of telematics data, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed system and a method for vehicle-battery state-of-charge (SOC)-based transmission of telematics data. Exemplary aspects of the disclosure provide a system that may comprise a control circuitry. The control circuitry may be configured to transmit a threshold value corresponding to a predefined SOC of a battery of a vehicle to a set of vehicles. The control circuitry may be further configured to control, each vehicle of the set of vehicles, to monitor a SOC of the battery of the corresponding vehicle of the set of vehicles. The control circuitry may be further configured to control, each vehicle of the set of vehicles, to determine whether the monitored SOC of the battery of the corresponding vehicle, of the set of vehicles, exceeds the transmitted threshold value. The control circuitry may be further configured to control, each vehicle of the set of vehicles, to determine telematics data associated with the corresponding vehicle of the set of vehicles, based on the determination that the monitored SOC of the battery of the corresponding vehicle exceeds the transmitted threshold value. The control circuitry may be further configured to receive the determined telematics data associated with the corresponding vehicle of the set of vehicles from each vehicle of the set of vehicles. The control circuitry may be further configured to analyze the telematics data received from each vehicle, of the set of vehicles, to determine statistical information related to the analyzed telematics data. The control circuitry may be further configured to control rendering of the determined statistical information related to the analyzed telematics data on a display device.

With an increasing focus on techniques for reduction of carbon emissions from conventional vehicles, demand for electric vehicles (EVs) is increasing. The EV may include an electrical motor that may derive electrical power from a rechargeable battery. The rechargeable battery may need to be charged from a charging station. The charging station may include a public charging station, home charging station, an office charging station, and the like. In order to meet a demand for charging stations for charging batteries of EVs, a requirement for a number of charging stations may need to be known in each location of a plurality of locations.

In order to mitigate aforesaid issues, the system of the present disclosure may transmit the threshold value corresponding to the predefined SOC of the battery of the vehicle to the set of vehicles. Thereafter, the system may control, each vehicle of the set of vehicles, to monitor the SOC of the battery of the corresponding vehicle of the set of vehicles. Further, the system may control, each vehicle of the set of vehicles, to determine whether the monitored SOC of the battery of the corresponding vehicle, of the set of vehicles, exceeds the transmitted threshold value. The system of present disclosure may control, each vehicle of the set of vehicles, to determine telematics data associated with the corresponding vehicle of the set of vehicles only when the monitored state-of-charge of the battery of the corresponding vehicle exceeds the transmitted threshold value. Thus, the battery associated with each vehicle may be conserved for performing critical operations associated with the corresponding vehicle. The system may receive the determined telematics data from each vehicle of the set of vehicles. The system may analyze the telematics data received from each vehicle, of the set of vehicles, to determine statistical information. The determined statistical information may be provided to an urban planner. The urban planner may set up electric vehicle supply equipment's (EVSEs) based on the determined statistical information.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a block diagram that illustrates an exemplary network environment for vehicle-battery state-of-charge (SOC)-based transmission of telematics data, in accordance with an embodiment of the disclosure. With reference to FIG. 1, there is shown a network environment diagram 100. The network environment diagram 100 may include an electronic device 102, a system 104, a set of vehicles 106, a server 108, and a database 110. For example, the set of vehicles 106 may include a first vehicle 106A, a second vehicle 106B, . . . and an Nth vehicle 106N. The electronic device 102, the system 104, the set of vehicles 106, and the server 108 may be communicatively coupled to each other via a communication network 112. Further, the database 110 may include a set of telematics data 114. For example, the set of telematics data 114 may include telematics data 114A, telematics data 114B, . . . , and telematics data 114N. In FIG. 1, there is further shown a user 116 associated with the system 104.

The N number of vehicles shown in FIG. 1 is presented merely as an example. The set of vehicles 106 may include only two vehicles or more than N vehicles, without deviation from the scope of the disclosure. For the sake of brevity, only N vehicles have been shown in FIG. 1. However, in some embodiments, there may be more than N vehicles, without limiting the scope of the disclosure.

The N number of subsets of telematics data shown in FIG. 1 is presented merely as an example. The set of telematics data 114 may include only two subsets of telematics data or more than N subsets of telematics data, without deviation from the scope of the disclosure. For the sake of brevity, only N subsets of telematics data have been shown in FIG. 1. However, in some embodiments, there may be more than N subsets of telematics data, without limiting the scope of the disclosure.

The electronic device 102 may include suitable logic, control circuitry, interfaces, and/or code that may be configured to receive telematics data associated with a vehicle (for example, the first vehicle 106A). Further, the electronic device 102 may render the received telematics data on a display device. Examples of the electronic device 102 may include, but are not limited to, a computing device, a smartphone, a cellular phone, a mobile phone, a computer work-station, a consumer electronic (CE) device, a vehicle remote controller device, a user wearable device, and/or any computing device that may be capable to remotely control a vehicle (for example, the first vehicle 106A). In an embodiment, the electronic device 102 may be associated with at least one of a manufacturer, a retailer, a dealer, a vendor, a service provider, an infrastructure provider, or a user associated with the vehicle (for example, the first vehicle 106A).

The system 104 may include suitable logic, control circuitry, interfaces, and/or code that may be configured to transmit a threshold value corresponding to a predefined state-of-charge (SOC) of a battery of a vehicle to the set of vehicles 106. The system 104 may be further configured to control, each vehicle of the set of vehicles 106, to monitor an SOC of the battery of the corresponding vehicle of the set of vehicles 106. The system 104 may be further configured to control, each vehicle of the set of vehicles 106, to determine whether the monitored SOC of the battery of the corresponding vehicle, of the set of vehicles 106, exceeds the transmitted threshold value. The system 104 may be further configured to control, each vehicle of the set of vehicles 106, to determine telematics data associated with the corresponding vehicle of the set of vehicles 106, based on the determination that the monitored SOC of the battery of the corresponding vehicle exceeds the transmitted threshold value. The system 104 may be further configured to receive, from each vehicle of the set of vehicles 106, the determined telematics data associated with the corresponding vehicle of the set of vehicles 106. The system 104 may be further configured to analyze the telematics data received from each vehicle, of the set of vehicles 106, to determine statistical information related to the analyzed telematics data. The system 104 may be further configured to control rendering of the determined statistical information related to the analyzed telematics data on a display device.

Examples of the system 104 may include, but are not limited to, a computing device, a smartphone, a cellular phone, a mobile phone, a mainframe machine, a server, a computer work-station, a consumer electronic (CE) device, a vehicle remote controller device, a user wearable device, and/or any computing device that may be capable to remotely control one or more vehicles and may be associated with the user 116.

Each vehicle of the set of vehicles 106 may be a non-autonomous vehicle, a semi-autonomous vehicle, or a fully autonomous vehicle, for example, as defined by National Highway Traffic Safety Administration (NHTSA). Examples of the vehicle may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicle may be a system through which a rider (e.g., the user 116) may travel from a start point to a destination point. Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell based car, a solar powered-car, or a hybrid car. The present disclosure may be also applicable to other types of two-wheelers (e.g., a scooter) or four-wheelers. The description of other types of the vehicle has been omitted from the disclosure for the sake of brevity. Each of the set of vehicles 106 may be registered to a corresponding owner based on vehicle identification information associated with the corresponding vehicle.

The server 108 may include suitable logic, control circuitry, and interfaces, and/or code that may be configured to transmit the threshold value corresponding to the predefined SOC of the battery of a vehicle to the set of vehicles 106. The server 108 may control, each vehicle of the set of vehicles 106, to monitor the SOC of the battery of the corresponding vehicle of the set of vehicles 106. The server 108 may control, each vehicle of the set of vehicles 106, to determine whether the monitored SOC of the battery of the corresponding vehicle, of the set of vehicles 106, exceeds the transmitted threshold value. The server 108 may control, each vehicle of the set of vehicles 106, to determine telematics data associated with the corresponding vehicle of the set of vehicles 106, based on the determination that the monitored SOC of the battery of the corresponding vehicle exceeds the transmitted threshold value. The server 108 may receive the determined telematics data associated from each vehicle of the set of vehicles 106. The server 108 may analyze the telematics data received from each vehicle, of the set of vehicles 106, to determine statistical information related to the analyzed telematics data. The server 108 may control rendering of the determined statistical information related to the analyzed telematics data on the display device.

The server 108 may be implemented as a cloud server and may execute operations through web applications, cloud applications, HTTP requests, repository operations, file transfer, and the like. Other example implementations of the server 108 may include, but are not limited to, a database server, a file server, a web server, a media server, an application server, a mainframe server, or a cloud computing server.

In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the system 104 as two separate entities. In certain embodiments, the functionalities of the server 108 can be incorporated in its entirety or at least partially in the system 104, without a departure from the scope of the disclosure.

The database 110 may include suitable logic, interfaces, and/or code that may be configured to store information related to the set of vehicles 106, instructions to control the set of vehicles 106, and the set of telematics data 114. The database 110 may be derived from data off a relational or non-relational database, or a set of comma-separated values (csv) files in conventional or big-data storage. The database 110 may be stored or cached on a device, such as a server (e.g., the server 108) or the system 104. The device storing the database 110 may be configured to receive a query for vehicle identification information and/or the telematics data associated with the corresponding vehicle from the server 108 and/or the system 104. In response, the device of the database 110 may be configured to retrieve and provide the queried vehicle identification information or and/or the telematics data associated with the corresponding vehicle to the server 108 and/or the system 104 based on the received query.

In some embodiments, the database 110 may be hosted on a plurality of servers stored at same or different locations. The operations of the database 110 may be executed using hardware including a processor, a microprocessor (e.g., to perform or control performance of one or more operations), a field-programmable gate array (FPGA), or an application-specific integrated circuit (ASIC). In some other instances, the database 110 may be implemented using software.

The communication network 112 may include a communication medium through which the system 104, the set of vehicles 106, and the server 108 may communicate with each other. The communication network 112 may be one of a wired connection or a wireless connection. Examples of the communication network 112 may include, but are not limited to, the Internet, a cloud network, Cellular or Wireless Mobile Network (such as Long-Term Evolution and 5G New Radio), satellite network (e.g., a network of a set of low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The set of telematics data 114 may include the telematics data associated with each vehicle of the set of vehicles 106. In an embodiment, the telematics data associated with a vehicle may correspond to at least one of on-board diagnostic data (OBD) parameters of the vehicle, speed information of the vehicle, acceleration and deacceleration information of the vehicle, a health status of the vehicle, road conditions related to a route of the vehicle, weather conditions related to the route of the vehicle, location information of the route of the vehicle, tachometer information of the vehicle, over-speeding information of the vehicle, lane-changing information of the vehicle, driving behavior of a driver of the vehicle, vehicle occupancy information of the vehicle, fuel efficiency information of the vehicle, engine tuning information of the vehicle, battery charging information of the vehicle, batter health information of the vehicle, tire pressure information of the vehicle, or maintenance/service information of the vehicle.

In operation, the system 104 may be configured transmit, to each vehicle of the set of vehicles 106, the threshold value corresponding to the predefined SOC of a battery of the corresponding vehicle. In an embodiment, the predefined SOC (e.g., 25% battery SOC charging) may be an amount of charge of the battery that may be saved to execute critical operations associated with the vehicle. Details related to the transmission of the threshold value are further provided, for example, in FIG. 5.

The system 104 may control, each vehicle of the set of vehicles 106, to monitor the SOC of the battery of the corresponding vehicle of the set of vehicles 106. Each vehicle may include a battery sensor that may measure the SOC of the battery of the corresponding vehicle. Details related to the monitoring of the SOC are further provided, for example, in FIG. 5.

The system 104 may control, each vehicle of the set of vehicles 106, to determine whether the monitored SOC of the battery of the corresponding vehicle, of the set of vehicles 106, exceeds the transmitted threshold value. Herein, the monitored SOC of each vehicle may be compared with the transmitted threshold value. Based on comparison, it may be determined whether the monitored SOC of the battery of the corresponding vehicle exceeds the transmitted threshold value. Details related to the comparison of the SOC with the transmitted threshold value are further provided, for example, in FIG. 5.

The system 104 may control, each vehicle of the set of vehicles 106, to determine telematics data associated with the corresponding vehicle of the set of vehicles 106, based on the determination that the monitored SOC of the battery of the corresponding vehicle exceeds the transmitted threshold value. Operations associated with the determination of the telematics data associated with each vehicle may be uncritical operations. As the predefined SOC may be the amount of charge of the battery that may be saved to execute critical operations, the telematics data associated with each vehicle may be determined only when the monitored SOC of the battery of the corresponding vehicle exceeds the transmitted threshold value. Thus, the predefined SOC of the battery may be preserved for critical operations of the vehicle, such as, ignition of the vehicle or to run critical electronic/mechanical components of the vehicle when the vehicle is off. Details related to the telematics data determination are further provided, for example, in FIG. 5.

The system 104 may receive, from each vehicle of the set of vehicles 106, the determined telematics data associated with the corresponding vehicle of the set of vehicles 106. Herein, upon determination of the telematics data, each vehicle may transmit the determined telematics data associated with the corresponding vehicle to the system 104. Details related to the telematics data reception are further provided, for example, in FIG. 5.

The system 104 may analyze the telematics data received from each vehicle, of the set of vehicles 106, to determine statistical information related to the analyzed telematics data. In an embodiment, the statistical information may be a graphical representation of at least one of location information or energy demand information, associated with a charging of each vehicle of the set of vehicles 106. In another embodiment, the statistical information may be a tabular representation of a number of vehicles of the set of vehicles 106 in each geographical location of a set of geographical locations. Details related to the analyzing of the telematics data are further provided, for example, in FIG. 5.

The system 104 may control a rendering of the determined statistical information related to the analyzed telematics data on a display device. The determined statistical information may be rendered on the display device so that an urban planner such as, the user 116, may analyze the rendered statistical information to plan for and/or set up electric vehicle supply equipments (EVSEs) in each geographical location. Details related to the rendering of the statistical information are further provided, for example, in FIG. 5.

Figure 2:
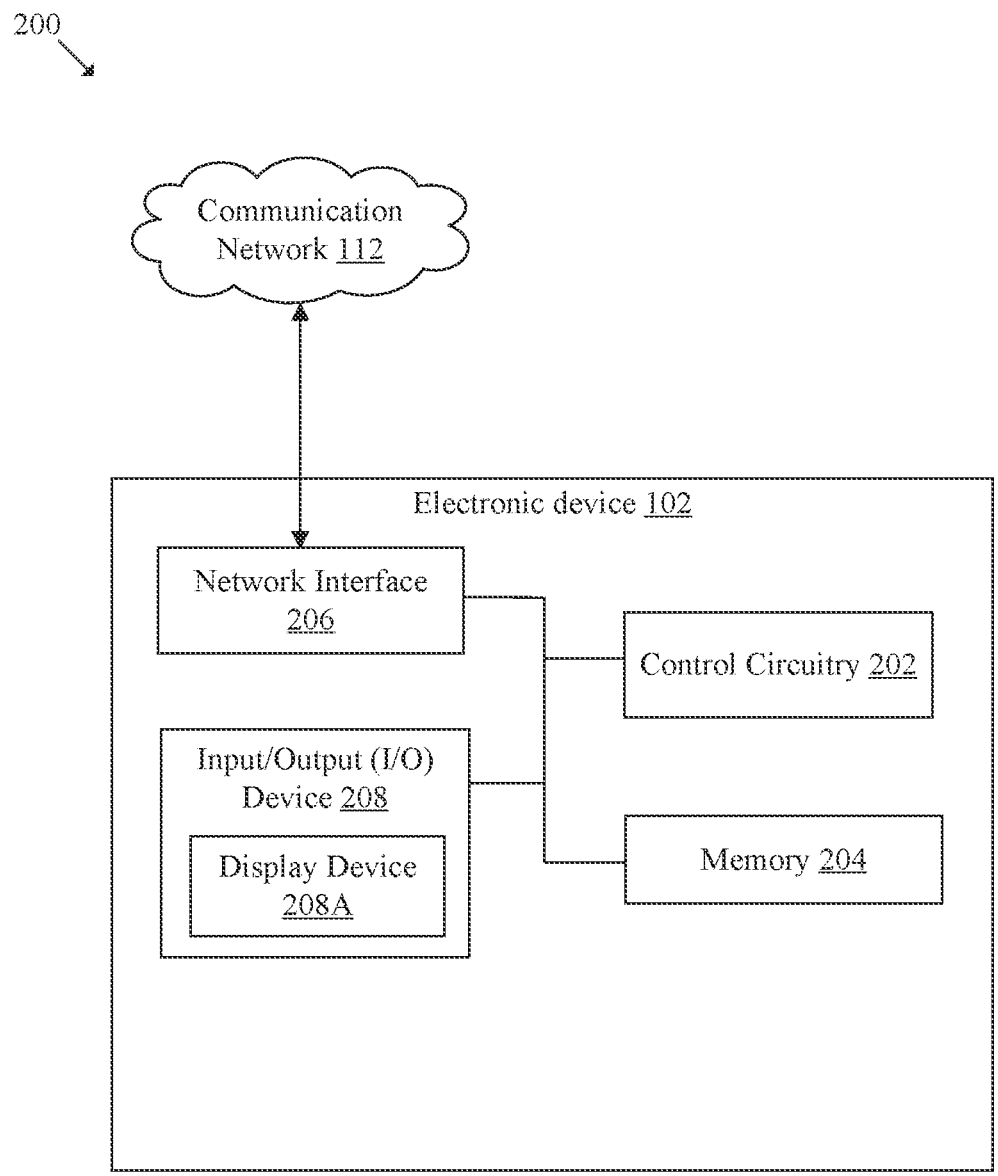
FIG. 2 is a block diagram that illustrates an exemplary electronic device of FIG. 1, in accordance with an embodiment of the disclosure.

FIG. 2 is a block diagram that illustrates an exemplary electronic device of FIG. 1 to control vehicles, in accordance with an embodiment of the disclosure. FIG. 2 is explained in conjunction with elements from FIG. 1. With reference to FIG. 2, there is shown a block diagram 200 of the electronic device 102. The electronic device 102 may include a control circuitry 202, a memory 204, a network interface 206, and an input/output (I/O) device 208. The input output device 208 may include a display device 208A. Although in FIG. 2, it is shown that the electronic device 102 includes the control circuitry 202, the memory 204, the network interface 206, and the input/output (I/O) device 208; however, the disclosure may not be so limiting, and the electronic device 102 may include less or more components to perform the same or other functions of the electronic device 102. Details of the other functions or components have been omitted from the disclosure for the sake of brevity.

The control circuitry 202 may include suitable logic, control circuitry, and interfaces that may be configured to execute program instructions associated with different operations to be executed by the electronic device 102. For example, some of the operations may include, telematics data reception and rendering of the telematics data. The control circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The control circuitry 202 may be implemented based on a number of processor technologies known in the art. Examples of implementations of the control circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, control circuitry, and interfaces that may be configured to store the one or more instructions to be executed by the control circuitry 202. The memory 204 that may be configured to store the set of telematics data 114 and the vehicle identification information associated with a vehicle such as, the first vehicle 106A. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may include suitable logic, control circuitry, and interfaces that may be configured to facilitate communication between the electronic device 102, the system 104, the set of vehicles 106, and the server 108, via the communication network 112. The network interface 206 may be implemented by use of various known technologies to support wired or wireless communication of the electronic device 102 with the communication network 112. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer control circuitry. The network interface 206 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5$^{th}$ Generation New Radio (5G NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging, and a Short Message Service (SMS).

The I/O device 208 may include suitable logic, control circuitry, and interfaces that may be configured to receive an input from the user 116 and provide an output based on the received input. The I/O device 208 which may include various input and output devices, may be configured to communicate with the electronic device 102 or the server 108. Examples of the I/O device 208 may include, but are not limited to, a touch screen, a keyboard, a mouse, a joystick, a microphone, a display device (e.g., the display device 208A), a haptic device, and a speaker.

The display device 208A may include suitable logic, control circuitry, and interfaces that may be configured to display the received telematics data. The display device 208A may be a touch screen which may enable the user 116 to provide a user-input, via the display device 208A. The touch screen may be at least one of a resistive touch screen, a capacitive touch screen, or a thermal touch screen. The display device 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208A may refer to a display screen of a head mounted device (HMD), a smart-glass device, a see-through display, a projection-based display, an electro-chromic display, or a transparent display.

Figure 3:
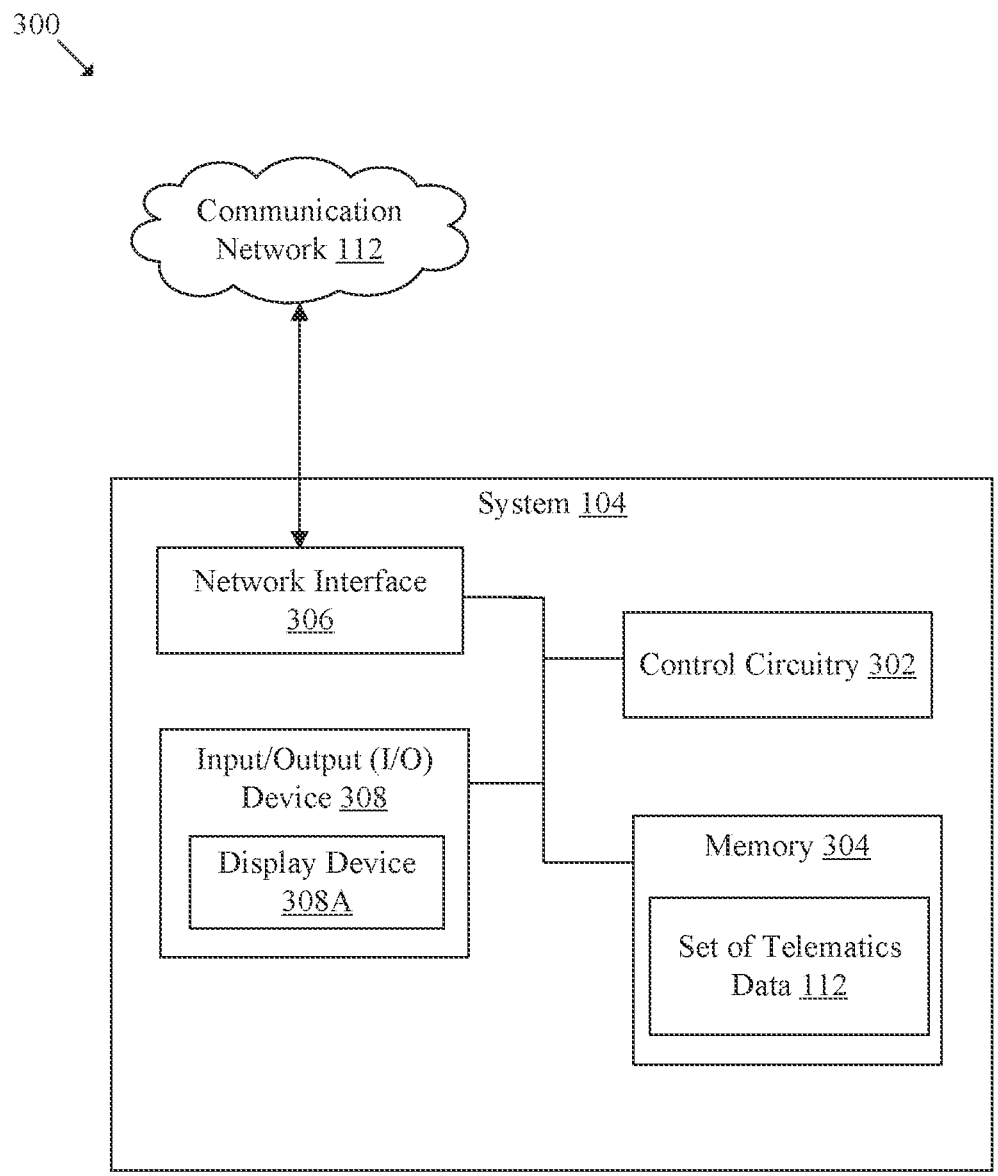
FIG. 3 is a block diagram that illustrates an exemplary system of FIG. 1 to control a set of vehicles, in accordance with an embodiment of the disclosure.

FIG. 3 is a block diagram that illustrates an exemplary system of FIG. 1 to control vehicles, in accordance with an embodiment of the disclosure. FIG. 3 is explained in conjunction with elements from FIG. 1 and FIG. 2. With reference to FIG. 3, there is shown a block diagram 300 of the system 104. The system 104 may include a control circuitry 302, a memory 304, a network interface 306, and an input/output (I/O) device 308. The input output device 308 may include a display device 308A. Although in FIG. 2, it is shown that the system 104 includes the control circuitry 302, the memory 304, the network interface 306, and the input/output (I/O) device 308; however, the disclosure may not be so limiting, and the system 104 may include less or more components to perform the same or other functions of the system 104. Details of the other functions or components have been omitted from the disclosure for the sake of brevity.

The control circuitry 302 may include suitable logic, control circuitry, and interfaces that may be configured to execute program instructions associated with different operations to be executed by the system 104. For example, some of the operations may include threshold value transmission, state-of-charge monitoring, controlling each vehicle of the set of vehicles for telematics data telematics data determination, telematics data reception, statistical information determination, and rendering of statistical information. The control circuitry 302 may include one or more specialized processing units, which may be implemented as a separate processor. In an embodiment, the one or more specialized processing units may be implemented as an integrated processor or a cluster of processors that perform the functions of the one or more specialized processing units, collectively. The control circuitry 302 may be implemented based on a number of processor technologies known in the art. Examples of implementations of the control circuitry 302 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 304 may include suitable logic, control circuitry, and interfaces that may be configured to store the one or more instructions to be executed by the control circuitry 302. The memory 304 that may be configured to store the vehicle identification information associated with the set of vehicles 106 and the set of telematics data 114.

Examples of implementation of the memory 304 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 306 may include suitable logic, control circuitry, and interfaces that may be configured to facilitate communication between the system 104, the electronic device 102, the set of vehicles 106, and the server 108, via the communication network 112. The network interface 306 may be implemented by use of various known technologies to support wired or wireless communication of the system 104 with the communication network 112. The network interface 306 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer control circuitry. The network interface 306 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation New Radio (5G NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging, and a Short Message Service (SMS).

The I/O device 308 may include suitable logic, control circuitry, and interfaces that may be configured to receive an input from the user 116 and provide an output based on the received input. The I/O device 308 which may include various input and output devices, may be configured to communicate with the system 104 or the server 108. Examples of the I/O device 308 may include, but are not limited to, a touch screen, a keyboard, a mouse, a joystick, a microphone, a display device (e.g., the display device 308A), a haptic device, and a speaker.

The display device 308A may include suitable logic, control circuitry, and interfaces that may be configured to display information related to the set of vehicles 106 and the determined statistical information. The display device 308A may be a touch screen which may enable the user 116 to provide a user-input, via the display device 308A. The touch screen may be at least one of a resistive touch screen, a capacitive touch screen, or a thermal touch screen. The display device 308A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 308A may refer to a display screen of a head mounted device (HMD), a smart-glass device, a see-through display, a projection-based display, an electro-chromic display, or a transparent display.

The functions or operations executed by the system 104, as described in FIG. 1, may be performed by the control circuitry 302. Operations executed by the control circuitry 302 are described in detail, for example, in FIG. 5.

Figure 4:
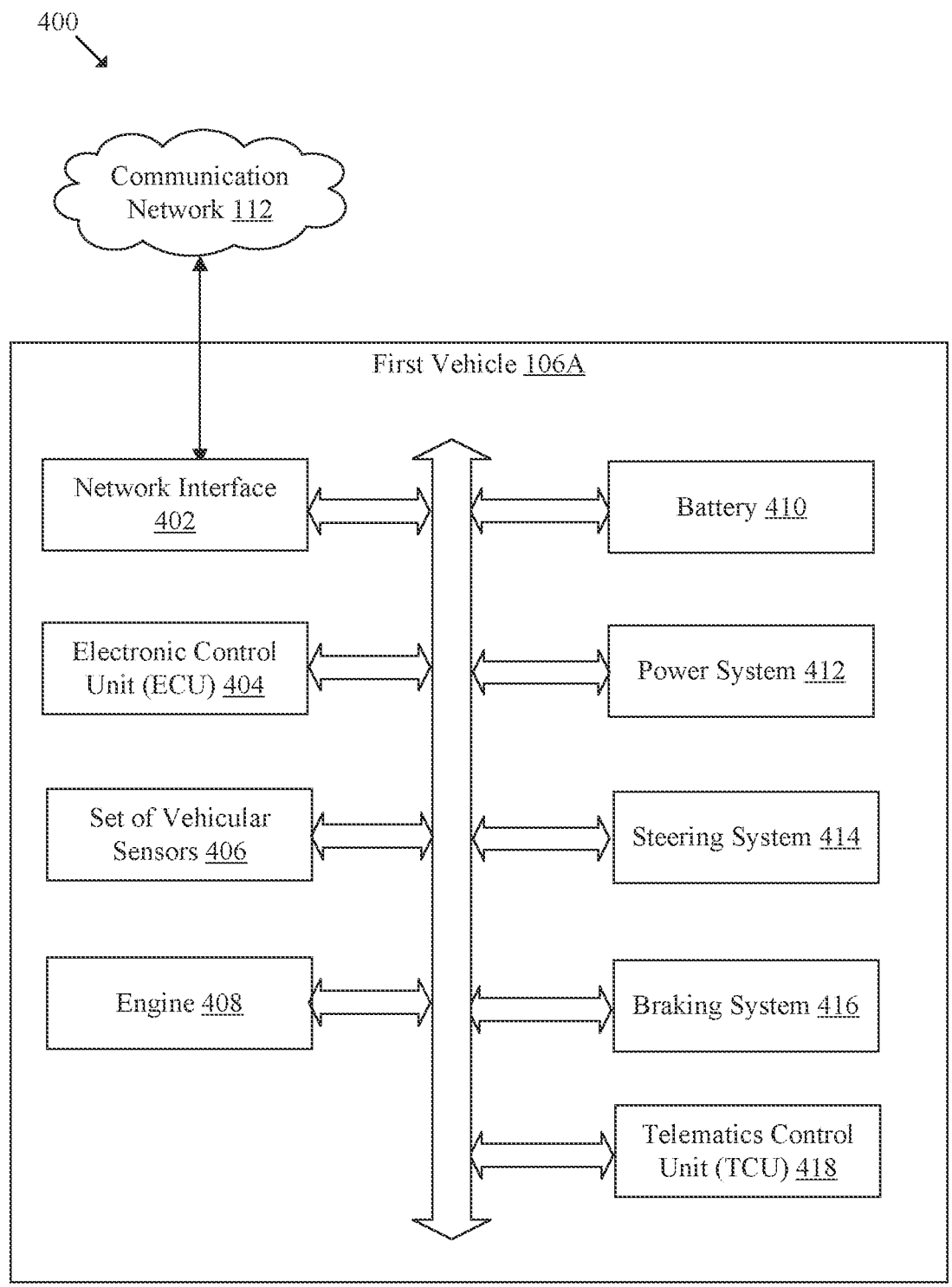
FIG. 4 is a block diagram that illustrates an exemplary first vehicle of FIG. 1, in accordance with an embodiment of the disclosure.

FIG. 4 is a block diagram that illustrates an exemplary first vehicle of FIG. 1, in accordance with an embodiment of the disclosure. FIG. 4 is explained in conjunction with elements from FIG. 1, FIG. 2, and FIG. 3. With reference to FIG. 4, there is shown a block diagram 400 of the first vehicle 106A. The first vehicle 106A may include a network interface 402, an electronic control unit (ECU) 404, a set of vehicular sensors 406, an engine 408, a battery 410, a power system 412, a steering system 414, a braking system 416, and a telematics control unit (TCU) 418. Although in FIG. 4, it is shown that the first vehicle 106A includes the network interface 402, the electronic control unit 404, the set of vehicular sensors 406, the engine 408, the battery 410, the power system 412, the steering system 414, the braking system 416, and the TCU 418; however, the disclosure may not be so limiting, and the first vehicle 106A may include less or more components to perform the same or other functions of the first vehicle 106A. Details of the other functions or components have been omitted from the disclosure for the sake of brevity.

The network interface 402 may include suitable logic, control circuitry, and interfaces that may be configured to facilitate communication between the first vehicle 106A, the electronic device 102, the system 104, and the server 108, via the communication network 112. The network interface 402 may be implemented by use of various known technologies to support wired or wireless communication of the first vehicle 106A with the communication network 112. The network interface 402 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer control circuitry. The network interface 402 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation New Radio (5G NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging, and a Short Message Service (SMS).

The electronic control unit (ECU) 404 may include suitable logic, control circuitry, interfaces, and/or code that may be configured to activate or deactivate the set of vehicular sensors 406 and the TCU 418. The electronic control unit 404 may be a specialized electronic control circuitry that may include an ECU processor to control different functions, such as, but not limited to, engine operations, communication operations, and data acquisition of the first vehicle 106A. In an embodiment, the electronic control unit 404 may be a microprocessor. Other examples of the electronic control unit 404 may include, but are not limited to, a vehicle control system, an in-vehicle infotainment (IVI) system, an in-car entertainment (ICE) system, an automotive Head-up Display (HUD), an automotive dashboard, an embedded device, a smartphone, a human-machine interface (HMI), a computer workstation, a handheld computer, a cellular/mobile phone, a portable consumer electronic (CE) device, a server, and other computing devices. The electronic control unit 404 may be included or integrated in the first vehicle 106A.

In an embodiment, the electronic control unit 404 may a control circuitry that may be configured to receive a threshold value corresponding to a predefined state-of-charge of the battery 410 of a vehicle (for example, the first vehicle 106A). The control circuitry may monitor a SOC of the battery 410 of the vehicle (for example, the first vehicle 106A). The control circuitry may determine whether the monitored SOC of the battery 410 of the vehicle (for example, the first vehicle 106A) exceeds the received threshold value. The control circuitry may determine telematics data associated with the vehicle (for example, the first vehicle 106A) based on the determination that the monitored SOC of the battery 410 of the vehicle (for example, the first vehicle 106A) exceeds the received threshold value. The control circuitry may transmit the determined telematics data associated with the vehicle (for example, the first vehicle 106A). The control circuitry may control rendering of the transmitted telematics data on a display device (for example, the display device 208A).

The set of vehicular sensors 406 may include a speedometer, an accelerometer, a location sensor, a tachometer, a weather sensor, an imaging sensor, a pressure sensor, a temperature sensor, a level sensor, a shock absorber, and the like. The speedometer may measure an instantaneous or an average speed of the first vehicle 106A. The accelerometer may measure an instantaneous or an average acceleration of the first vehicle 106A. The location sensor may determine a location of the first vehicle 106A. The tachometer may determine a speed in rotations per minute of the engine 408 of the first vehicle 106A. The weather sensor may determine a weather of the location of the first vehicle 106A. The imaging sensor may capture images of a region around the first vehicle 106A. The pressure sensor may determine a pressure of fluids (for example, engine oil, transmission oil, and hydraulic oil) of the first vehicle 106A. The level sensor may determine a level of fluids of the first vehicle 106A. The temperature sensor may determine a temperature of a region around the first vehicle 106A.

The engine 408 may be configured to provide power to the first vehicle 106A. The engine 408 may be an internal combustion engine with may include operations, for example, fuel injection, compression, ignition, or emission to power and drive the first vehicle 106A. The engine 408 may include various parts, for example, but are not limited to, a crankshaft, a cylinder, a spark plug, a piston, camshaft, a valve, combustion chamber, etc. In some embodiments, the engine 408 may include a motor in case of an electric motorcycle. The engine 408 may be two-stroke or four-stroke internal combustion engines. The engine 408 may include either one, two, three, four, or six cylinders. Examples of the engine 408 may include, but are not limited to, an inline engine (i.e. single cylinder, parallel twin, inline-triple, inline-four, inline-six), a V layout engine (i.e. V-twin engine, a V4 engine, a V8 engine), a flat (boxer) engine (i.e. flat-two, flat-four, flat-six), a lawn mower engine, a snow blower engine, or other motorcycle engines known in the art. A description of various parts of the engine 408 has been omitted from the disclosure for the sake of brevity.

The battery 410 may be a source of electric power for one or more electric circuits or loads (not shown). For example, the battery 410 may be a source of electrical power to a control circuitry (not shown) of the first vehicle 106A, network interface 402, the electronic control unit 404, the engine 408, the power system 412, the steering system 414, and the braking system 416. The battery 410 may be a rechargeable battery. The battery 410 may be the source of electrical power to start the engine 408 of the first vehicle 106A. In some embodiments, the battery 410 may correspond to a battery pack, which may have a plurality of clusters of batteries, which may be surrounded by a suitable coolant and a charge controller (not shown in FIG. 4). Examples of the battery 410 may include, but are not limited to, a lead acid battery, a nickel cadmium battery, a nickel-metal hydride battery, a lithium-ion battery, and other rechargeable batteries.

The power system 412 may include suitable logic, control circuitry, interfaces, and/or code that may be configured to control electric power which may be output to various electric circuits and loads of the first vehicle 106A. The power system 412 may include a battery (not shown) to provide the electric power to perform various electrical operations of the first vehicle 106A. The power system 412 may provide the electric power for functioning of different components (such as, the electronic control unit 404, a communication system, the steering system 414, and the set of vehicular sensors 406) of the first vehicle 106A. The power system 412 may be configured to receive control signals from the processor to control the electronic control unit 404, the communication system, the steering system 414, and the set of vehicular sensors 406 of the first vehicle 106A. The power system 412 may be configured to control the charging and the discharging of the battery 410 and an auxiliary battery based on the received control signals. The power system 412 may be configured to control the transfer of the electric energy between the power system 412 and the communication system, the set of vehicular sensors 406, the steering system 414, and the set of vehicular sensors 406 of the first vehicle 106A. Examples of the power system 412 may include, but are not limited to, an electric charge/discharge controller, a charge regulator, a battery regulator, a battery management system, an electric circuit breaker, a power electronic drive control system, an Application-Specific Integrated Circuit (ASIC) processor, and/or other energy-control hardware processors.

The steering system 414 may receive one or more control commands from the user 116. The steering system 414 may include a steering wheel/handlebar and/or an electric motor (provided for a power-assisted steering) that may be used by a driver to control movement of the first vehicle 106A in manual mode or a semi-autonomous mode. In accordance with an embodiment, the movement or steering of the first vehicle 106A may be automatically controlled when the first vehicle 106A is in autonomous mode. Examples of the steering system 414 may include, but are not limited to, an autonomous steering control, a power-assisted steering system, a vacuum/hydraulic-based steering system, an electro-hydraulic power-assisted system (EHPAS), or a "steer-by-wire" system, or an autonomous steering system, known in the art.

The braking system 416 may be used to stop or slow down the first vehicle 106A by application of resistive forces, such as electromagnetic and/or frictional forces. The braking system 416 may receive a command from a powertrain control system under the control of a control circuitry when the first vehicle 106A is in an autonomous mode or a semi-autonomous mode. In accordance with an embodiment, the braking system 416 may receive a command from the control circuitry when the control circuitry preemptively detects intent of the user 116 to perform a specific task which requires the user 116 to apply brakes.

The TCU 418 may include suitable logic, control circuitry, and interfaces that may be configured to activate or deactivate each vehicular sensor of the set of vehicular sensors 406 of the first vehicle 106A based on certain conditions. Further, the TCU 418 may receive outputs of each vehicular sensor of the set of vehicular sensors 406 to determine the telematics data associated with the first vehicle 106A. In an embodiment, the TCU 418 associated with the first vehicle 106A may be deactivated when the first vehicle 106A is switched off and not charging. In an embodiment, the control circuitry of the ECU 404 may be further configured activate the TCU 418 associated with the first vehicle 106A based on the determination that the monitored state-of-charge of the battery 410 of the first vehicle 106A exceeds the received threshold value.

Figure 5:
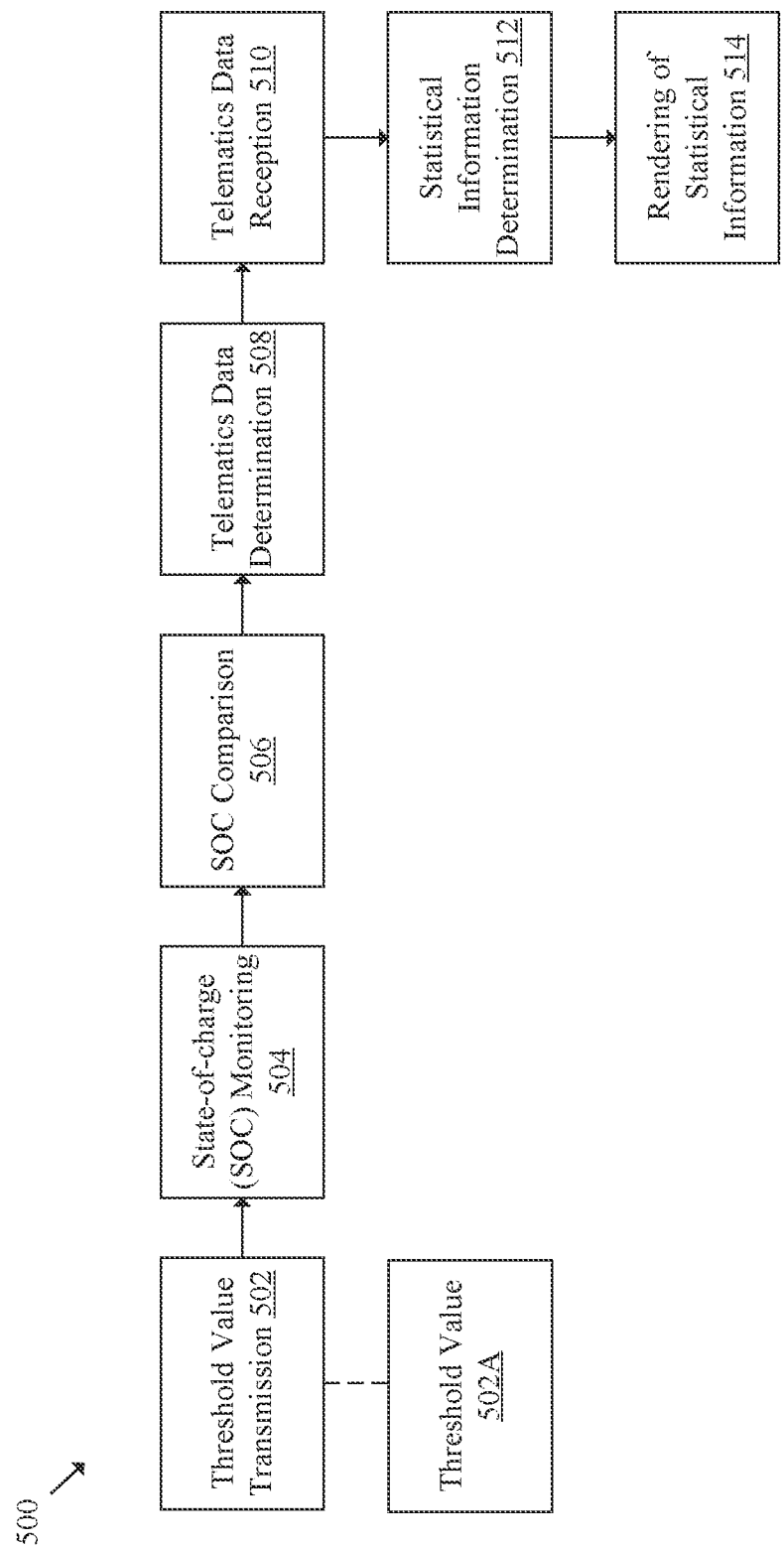
FIG. 5 is a diagram that illustrates an execution pipeline for determination of statistical information based on telematics data associated with each vehicle of a set of vehicles, in accordance with an embodiment of the disclosure.

FIG. 5 is a diagram that illustrates an execution pipeline for determination of statistical information based on telematics data associated with each vehicle of a set of vehicles, in accordance with an embodiment of the disclosure. FIG. 5 is explained in conjunction with elements from FIG. 1, FIG. 2, FIG. 3, and FIG. 4. With reference to FIG. 5, there is shown an execution pipeline 500 of exemplary operations from 502 to 514 that may be executed by the control circuitry 302 of the system 104. FIG. 5 further illustrates a threshold value 502A.

At 502, an operation of threshold value transmission may be executed. In an embodiment, the control circuitry 302 may be configured to transmit the threshold value 502A corresponding to the SOC of the battery (for example, the battery 410) of the vehicle (for example, the first vehicle 106A) to the set of vehicles 106. It may be appreciated that an SOC of a battery may provide information associated with an amount of charge that may be available in the battery at a time instant. The provided information may be relative to a capacity of the battery. In an example, the SOC may be represented in terms of a percentage of charge left in the battery. The predefined SOC of the battery may be a minimum percentage of charge that may be needed to be present in a battery of a vehicle so that a set of critical operations associated with the vehicle may be executed. In an example, the predefined SOC of the battery may be "25" percent.

At 504, an operation of SOC monitoring may be executed. In an embodiment, the control circuitry 302 may be configured to control, each vehicle of the set of vehicles 106, to monitor the SOC of the battery (for example, the battery 410 of FIG. 3) of the corresponding vehicle (for example, the first vehicle 106A of FIG. 1) of the set of vehicles 106. In an embodiment, each vehicle of the set of vehicles may include a battery sensor. The control circuitry 302 may control the battery sensor of each vehicle of the set of vehicles 106. The battery sensor may continuously measure a current and/or a voltage of the battery (for example, the battery 410 of FIG. 3) of the corresponding vehicle (for example, the first vehicle 106A of FIG. 1). Based on the measured current and/or the voltage, the battery sensor may determine the SOC of the battery (for example, the battery 410 of FIG. 3) of the corresponding vehicle (for example, the first vehicle 106A of FIG. 1).

In an embodiment, the control circuitry 302 may be configured to control, each vehicle (for example, the first vehicle 106A of FIG. 1) of the set of vehicles 106, to determine whether the corresponding vehicle (for example, the first vehicle 106A of FIG. 1), of the set of vehicles 106, is connected to a charging station and is being charged at the charging station. The SOC of the corresponding vehicle (for example, the first vehicle 106A of FIG. 1) may be monitored based on the determination that the corresponding vehicle is connected to the charging station and is being charged at the charging station. A set of operations associated with each vehicle (for example, the first vehicle 106A of FIG. 1) for determination of the telematics data of the vehicle (for example, the first vehicle 106A) may be uncritical operations of the vehicle (for example, the first vehicle 106A of FIG. 1). Therefore, in order to preserve the charge of the battery 410 for providing power to execute the set of critical operations, the control circuitry 302 may determine whether the vehicle (for example, the first vehicle 106A) is being charged at the charging station. In case the vehicle (for example, the first vehicle 106A) is being charged at the charging station, then the uncritical operations of the vehicle (for example, the first vehicle 106A of FIG. 1) may be executed.

In an embodiment, there may be a change in state of the vehicle (for example, the first vehicle 106A). For example, an ignition of the vehicle may be turned "on" from an "off" state or a battery (for example, the battery 410) associated with the vehicle (for example, the first vehicle 106A) may be charged. In such a situation, a charging rate may be transmitted to the system 104. Further, in case the battery (for example, the battery 410) of the vehicle (for example, the first vehicle 106A) is charging, then an initial SOC and a charge rate may be determined. Thereafter, the SOC of the battery (for example, the battery 410) may be estimated at regular intervals based on the initial SOC and the charge rate.

At 506, an operation of SOC comparison may be executed. In an embodiment, the control circuitry 302 may be configured to control, each vehicle of the set of vehicles 106, to determine whether the monitored state-of-charge of the battery (for example, the battery 410 of FIG. 3) of the corresponding vehicle (for example, the first vehicle 106A of FIG. 1), of the set of vehicles 106, exceeds the transmitted threshold value 502A. Herein, the control circuitry 302 may be configured to control each vehicle of the set of vehicles 106, to compare the monitored state-of-charge of the battery of the corresponding vehicle with the transmitted threshold value 502A. Based on the comparison, each vehicle may determine whether the monitored state-of-charge of the battery of the corresponding vehicle exceeds the transmitted threshold value 502A. In case the monitored state-of-charge of the battery of the corresponding vehicle exceeds the transmitted threshold value 502A, execution of the operations in the pipeline 500 may move to step 508. In case the monitored state-of-charge of the battery of the corresponding vehicle is below the transmitted threshold value 502A, execution of the operations in the pipeline 500 may move back to step 504.

At 508, an operation of telematics data determination may be executed. In an embodiment, the control circuitry 302 may be configured to control, each vehicle of the set of vehicles 106, to determine telematics data associated with the corresponding vehicle of the set of vehicles 106, based on the determination that the monitored SOC of the battery (for example, the battery 410) of the corresponding vehicle (for example, the first vehicle 106A) exceeds the transmitted threshold value 502A. Each of vehicle of the set of vehicles 106 may include the set of vehicular sensors such as, the set of vehicular sensors 406. In case, the monitored SOC of the battery (for example, the battery 410) of a vehicle (for example, the first vehicle 106A) of the set of vehicles 106 exceeds the transmitted threshold value, then the set of vehicular sensors 406 associated with the corresponding vehicle (for example, the first vehicle 106A) may be controlled to determine the telematics data associated with the corresponding vehicle (for example, the first vehicle 106A). In an example, the set of vehicular sensors 406 may include a fuel level sensor, the location sensor, the speedometer, and the pressure sensor. The fuel level sensor may output information associated with a fuel consumption of the vehicle (for example, the first vehicle 106A). The location sensor may output information associated with a location of the vehicle (for example, the first vehicle 106A). The speedometer may output information associated with a speed of the vehicle (for example, the first vehicle 106A). The pressure sensor may output information associated with tire pressure information of the vehicle (for example, the first vehicle 106A). The output from each vehicular sensor may be collected to form the telematics data. Thus, in the present example, the telematics data for the vehicle may include the information associated with the fuel consumption of the vehicle (for example, the first vehicle 106A), the location of the vehicle (for example, the first vehicle 106A), the speed of the vehicle (for example, the first vehicle 106A), and the tire pressure information of the vehicle (for example, the first vehicle 106A).

At 510, an operation of telematics data reception may be executed. In an embodiment, the control circuitry 302 may be configured to receive the determined telematics data from each vehicle of the set of vehicles 106. Upon determination of the telematics data, each vehicle may transmit the determined telematics data associated with the corresponding vehicle to the system 104.

It may be noted that in case a vehicle such as, the first vehicle 106A, is parked in a geographical location for an extended time duration, then the telematics data, (for example, the SOC of the battery and a geographical location of the vehicle) associated with the corresponding vehicle may be transmitted at pre-defined time intervals. That is, the determination and the transmission of the telematic data associated with the vehicle may be limited. Therefore, the battery (for example, the battery 410) associated with the vehicle may be saved. In an example, the first vehicle 106A may be parked in a geographical location "X" for a month. The first vehicle 106A may transmit the SOC of the battery and the geographical location of the first vehicle 106A to the control circuitry 302 only once on each day of the month. Thus, the battery 410 may be saved.

In an embodiment, the telematics data associated with a vehicle (for example, the first vehicle 106A) may be transmitted to the system 104 when an ignition associated with the corresponding vehicle is "off" or the battery (for example, the battery 410) associated with the corresponding vehicle is not being charged. When the ignition associated with the vehicle (for example, the first vehicle 106A) is "off", then the telematics data associated with the corresponding vehicle (for example, the first vehicle 106A) may be SOC of the battery (for example, the battery 410) associated with the vehicle, a geographical location of the vehicle, and a charging rate of the vehicle in case the battery of the vehicle is being charged.

At 512, an operation of statistical information determination may be executed. In an embodiment, the control circuitry 302 may be configured to analyze the telematics data received from each vehicle, of the set of vehicles 106, to determine statistical information related to the analyzed telematics data. In an embodiment, the statistical information may be a graphical representation of the telematics data received from each vehicle, of the set of vehicles 106. For example, in case the telematics data received from each vehicle includes the location information of the corresponding vehicle, then the telematics data received from each vehicle, of the set of vehicles 106 may be analyzed to determine a graph of "density of vehicles per square kilometer" versus geographical locations. In another embodiment, the statistical information may be a heat map. Herein, the telematics data received from each vehicle, of the set of vehicles 106 may be analyzed to determine the heat map. It may be appreciated that the heat map may depict a value of a parameter by a color coding. For example, the heat map may be determined by taking a "density of vehicles per square kilometer" along one axis and "geographical locations" along another axis. Herein, the density of vehicles per square kilometer may be color coded. In another embodiment, the statistical information may be a tabular representation of the telematics data received from each vehicle, of the set of vehicles 106. For example, the table of the "density of vehicles per square kilometer" for each "geographical location" may be constructed. An example scenario of a heat map generated based on the statistical information is described, for example, in FIG. 8.

At 514, an operation of rendering of the determined statistical information may be executed. In an embodiment, the control circuitry 302 may be configured to control rendering of the determined statistical information related to the analyzed telematics data on the display device 308A. The determined statistical information related to the analyzed telematics data may be rendered on the display device 308A so that the user 116 associated with system 104 may derive insights such as, a requirement of an amount of fuel for each location, a requirement of a number of charging stations for each location, a road condition of each location, and the like. For example, the heat map of the "density of vehicles per square kilometer" versus the "geographical location" may be rendered on the display device 308A. The user 116 associated with the system 104 may analyze the rendered heat map to determine the requirement of the number of charging stations for each geographical location based on the rendered heat map. It may be appreciated that the higher the "density of vehicles per square kilometer" for a "geographical location", the higher may be the requirement of the number of charging stations for the corresponding geographical location. Based on the determined requirement of the number of charging stations for each geographical location, a plan of setting-up charging stations for each geographical location may be determined. Thus, a requirement for a number of charging stations in each geographical location may be estimated. The estimated requirement may be used to plan EVSEs and other infrastructure facilities in the geographical locations. The estimation of the requirement may help to satisfy current and future demand for charging stations and EV infrastructure in the geographical locations. This may reduce the dependence on conventional vehicles, increase the adoption of the EVs in the geographical location, and thereby have a positive impact on reduction of carbon footprint in the geographical locations under consideration. An example scenario for the vehicle-battery SOC-based transmission of telematics data is described, for example, in FIG. 7.

Figure 6:
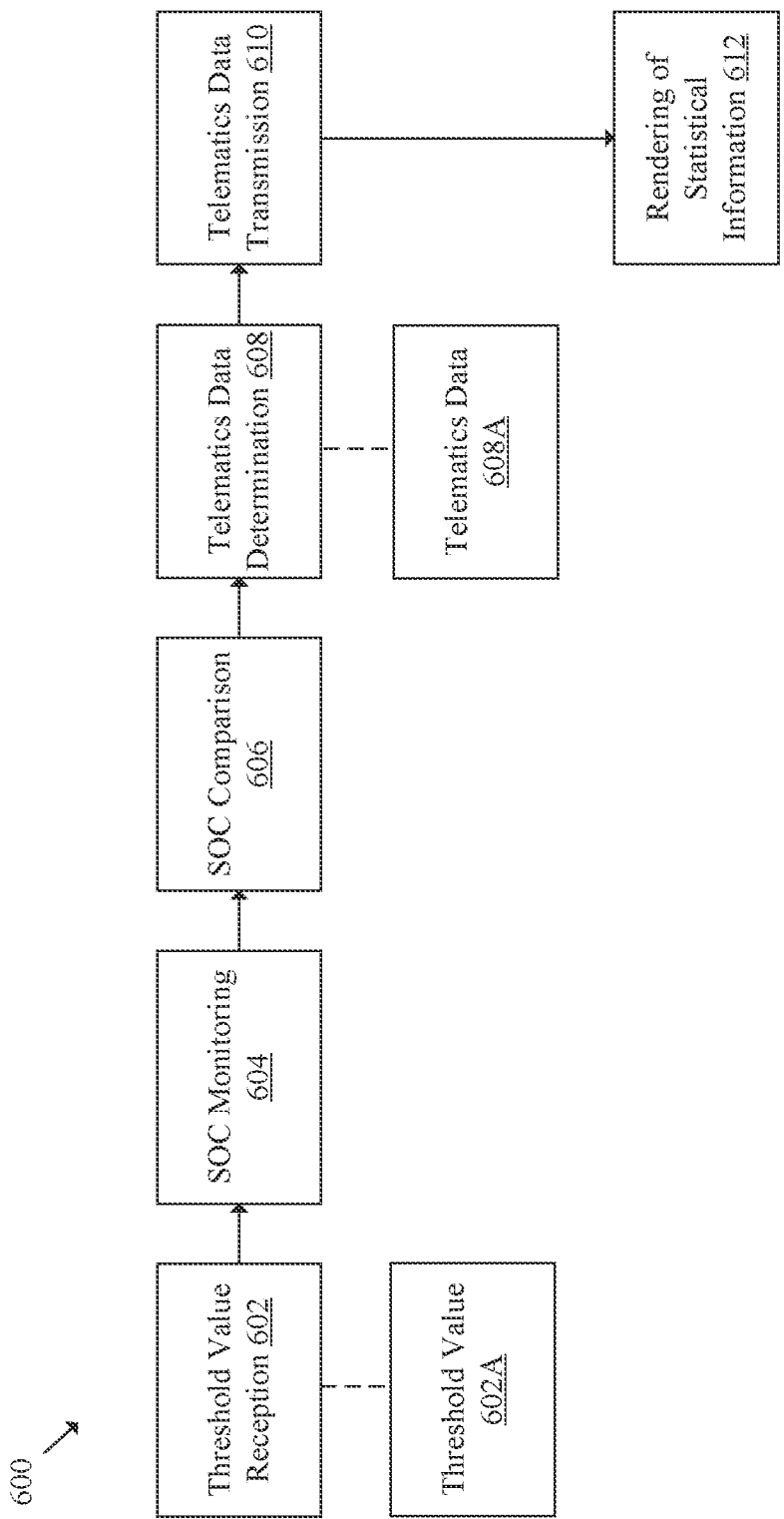
FIG. 6 is a diagram that illustrates an execution pipeline for vehicle-battery SOC-based transmission of telematics data, in accordance with an embodiment of the disclosure.

FIG. 6 is a diagram that illustrates an execution pipeline for vehicle-battery SOC-based transmission of telematics data, in accordance with an embodiment of the disclosure. FIG. 6 is explained in conjunction with elements from FIG. 1, FIG. 2, FIG. 3, FIG. 4, and FIG. 5. With reference to FIG. 6, there is shown an execution pipeline 600 of exemplary operations from 602 to 612 that may be executed by the control circuitry (e.g., the ECU 404) of the first vehicle 106A of FIG. 4. FIG. 6 further depicts, a threshold value 602A and telematics data 608A.

At 602, an operation of threshold value reception may be executed. In an embodiment, a control circuitry (e.g., the ECU 404) of the vehicle (e.g., the first vehicle 106A) may be configured to receive the threshold value 602A corresponding to the predefined SOC of the battery 410 of the vehicle (for example, the first vehicle 106A). The vehicle may be a non-autonomous vehicle, a semi-autonomous vehicle, or a fully autonomous vehicle that may be owned by the user 116. Examples of the vehicle may include, but are not limited to, the two-wheeler vehicle, the three-wheeler vehicle, the four-wheeler vehicle, and the hybrid vehicle. The vehicle (for example, the first vehicle 106A) may maintain a predefined SOC of the battery 410 as a reserve amount of charge so that critical functions (such as, battery initiated ignition) of the vehicle (for example, the first vehicle 106A) may be performed. In an example, the predefined SOC of the battery 410 may be "50" percent. In an embodiment, the predefined SOC of the battery 410 may be received based on a user input. In another embodiment, the predefined SOC of the battery 410 may be set internally at a time of manufacture of the vehicle (for example, the first vehicle 106A). Details related to the predefined SOC of the battery 410 are further provided, for example, in FIG. 5.

At 604, an operation of SOC monitoring may be executed. In an embodiment, the control circuitry (e.g., the ECU 404) may be configured to monitor the SOC of the battery 410 of the vehicle (for example, the first vehicle 106A). The vehicle (for example, the first vehicle 106A) may include the battery sensor that may continuously measure the current and/or the voltage of the battery 410 of the vehicle (for example, the first vehicle 106A). Based on the measured current and/or the voltage, the battery sensor may determine the SOC of the battery 410 of the vehicle (for example, the first vehicle 106A).

In an embodiment, the control circuitry (e.g., the ECU 404) may be further configured to determine whether the vehicle (for example, the first vehicle 106A) is connected to a charging station and is being charged at the charging station. The SOC of the battery 410 of the vehicle (for example, the first vehicle 106A) may be monitored based on the determination that the vehicle (for example, the first vehicle 106A) is connected to the charging station and is being charged at the charging station. Operations associated with the determination and rendering of the telematics data of the vehicle (for example, the first vehicle 106A) may uncritical operations of the vehicle. Hence, in order to preserve the charge of the battery 410 so that the set of critical operations associated with the vehicle (for example, the first vehicle 106A) may be performed, the control circuitry (e.g., the ECU 404) may determine whether the vehicle (for example, the first vehicle 106A) is being charged at the charging station. In case the vehicle (for example, the first vehicle 106A) is being charged at the charging station, then the uncritical operations of the vehicle may be executed.

In an embodiment, the control circuitry (e.g., the ECU 404) may be further associated with the set of vehicular sensors 406 and the TCU 418 associated with the vehicle (for example, the first vehicle 106A). The set of vehicular sensors 406 may include the speedometer, the accelerometer, the location sensor, the tachometer, the weather sensor, the imaging sensor, the pressure sensor, the temperature sensor, the level sensor, and the like. The speedometer may measure the instantaneous or the average speed of the vehicle (for example, the first vehicle 106A). The accelerometer may measure the instantaneous or the average acceleration of the vehicle (for example, the first vehicle 106A). The location sensor may determine the location of the vehicle (for example, the first vehicle 106A). The tachometer may determine the speed in rotations per minute of the engine 408 of the vehicle (for example, the first vehicle 106A). The weather sensor may determine the weather of the location of the vehicle (for example, the first vehicle 106A). The imaging sensor may capture images of the region around the vehicle (for example, the first vehicle 106A). The pressure sensor may determine the pressure of fluids (for example, engine oil, transmission oil, and hydraulic oil) of the vehicle (for example, the first vehicle 106A). The level sensor may determine the level of fluids of the vehicle (for example, the first vehicle 106A). The temperature sensor may determine the temperature of the region around the vehicle (for example, the first vehicle 106A). The TCU 418 may control each vehicular sensor of the set of vehicular sensors 406. For example, the TCU 418 may activate or deactivate each vehicular sensor of the set of vehicular sensors 406 based on certain conditions. Further, the TCU 418 may receive outputs of each vehicular sensor of the set of vehicular sensors 406.

In an embodiment, the TCU 418 associated with the vehicle (for example, the first vehicle 106A) may be deactivated when the vehicle (for example, the first vehicle 106A) is switched off and not charging. Operations associated with the TCU 418 may consume certain amount of power that may be derived from the battery 410. Thus, the TCU 418 may be turned off when the vehicle (for example, the first vehicle 106A) is switched off and not charging in order to save energy consumption and preserve charge of the battery 410 for executing the set of critical operations associated with the vehicle (for example, the first vehicle 106A).

At 606, an operation of SOC comparison may be executed. In an embodiment, the control circuitry (e.g., the ECU 404) may be configured to determine whether the monitored SOC of the battery 410 of the vehicle (for example, the first vehicle 106A) exceeds the received threshold value 602A. The control circuitry 302 may continuously monitor the SOC of the battery 410. The monitored SOC of the battery 410 may be compared with the threshold value 602A. For example, in case the vehicle (for example, the first vehicle 106A) is connected to a charging station and is being charged at the charging station, then the SOC of battery 410 may be continuously monitored and compared with the received threshold value 602A. If the SOC of battery 410 is greater than the received threshold value 602A, then execution of operations in the pipeline 600 may move to 608. If the SOC of battery 410 is less than the received threshold value 602A, then execution of operations in the pipeline 600 may move to 604.

In an embodiment, the control circuitry (e.g., the ECU 404) may be further configured activate the TCU 418 associated with the vehicle (for example, the first vehicle 106A) based on the determination that the monitored state-of-charge of the battery 410 of the vehicle (for example, the first vehicle 106A) exceeds the received threshold value 602A. The operations associated with the TCU 418 may require consumption of some amount of power such as, charge of the battery 410. Further, the operations associated with the TCU 418 may be the uncritical operations of the vehicle (for example, the first vehicle 106A). Thus, the TCU 418 associated with the vehicle (for example, the first vehicle 106A) may be activated when the monitored state-of-charge of the battery 410 of the vehicle (for example, the first vehicle 106A) exceeds the received threshold value 602A. Upon activation, the TCU 418 may activate each vehicular sensor of the set of vehicular sensors 406. Further, the TCU 418 may receive output generated from each vehicular sensor of the set of vehicular sensors 406.

In an embodiment, the control circuitry (e.g., the ECU 404) may be further configured to monitor, by the set of vehicular sensors 406, sensor information associated with vehicle (for example, the first vehicle 106A) over a period of time. For example, upon activation, the TCU 418 may monitor the speedometer, the accelerometer, the location sensor, the tachometer, the weather sensor, the imaging sensor, the pressure sensor, the temperature sensor, and the level sensor. Based on the monitoring of the set of vehicular sensors 406, the TCU 418 may determine the instantaneous or average speed of the vehicle (for example, the first vehicle 106A), the instantaneous or the average acceleration of the vehicle (for example, the first vehicle 106A), the location of the vehicle (for example, the first vehicle 106A), the speed in rotations per minute of the engine 408 of the vehicle (for example, the first vehicle 106A). The TCU 418 may further determine the weather of the location of the vehicle (for example, the first vehicle 106A), the images of the region around the vehicle (for example, the first vehicle 106A), the pressure of fluids of the vehicle (for example, the first vehicle 106A), the level of fluids of the vehicle (for example, the first vehicle 106A), and the temperature of the region around the vehicle (for example, the first vehicle 106A).

At 608, an operation of telematics data determination may be executed. In an embodiment, the control circuitry (e.g., the ECU 404) may be configured to determine the telematics data 608A associated with the vehicle (for example, the first vehicle 106A) based on the determination that the monitored state-of-charge of the battery 410 of the vehicle (for example, the first vehicle 106A) exceeds the received threshold value 602A. The received threshold value 602A may be the amount of SOC of the battery 410 that may be reserved for performing only the set of critical operations associated with the vehicle (for example, the first vehicle 106A). Therefore, in case the monitored state-of-charge of the battery 410 of the vehicle (for example, the first vehicle 106A) exceeds the received threshold value 602A, then uncritical operations associated with the vehicle, such an operation of telematics data determination, may be executed.

In an embodiment, the control circuitry (e.g., the ECU 404) may be further configured to determine, by the activated TCU 418, the telematics data 608A associated with the vehicle based on the activation of the TCU 418 and the monitored sensor information associated with the vehicle (for example, the first vehicle 106A). The monitored sensor information may be outputs each of the set of vehicular sensors 406. For example, the monitored sensor information may the instantaneous or average speed of the vehicle (for example, the first vehicle 106A), the instantaneous or the average acceleration of the vehicle, the location of the vehicle, the speed in rotations per minute of the engine 408 of the vehicle, the weather of the location of the vehicle, the images of the region around the vehicle, the pressure of fluids of the vehicle, the level of fluids of the vehicle, and the temperature of the region around the vehicle. For example, the monitored sensor information may be determined from the speedometer, the accelerometer, the location sensor, the tachometer, the weather sensor, the imaging sensor, the pressure sensor, the temperature sensor, and the level sensor, respectively. The output of each vehicular sensor of the set of vehicular sensors 406 may be collected to determine the telematics data 608A.

In embodiment, the telematics data 608A associated with the vehicle for example, the first vehicle 106A) may correspond to at least one of on-board diagnostic data (OBD) parameters of the vehicle (for example, the first vehicle 106A), speed information of the vehicle, acceleration and deacceleration information of the vehicle, a health status of the vehicle (for example, the first vehicle 106A), road conditions related to a route of the vehicle (for example, the first vehicle 106A), and weather conditions related to the route of the vehicle (for example, the first vehicle 106A) The telematics data 608A may further include location information of the route of the vehicle (for example, the first vehicle 106A), tachometer information of the vehicle (for example, the first vehicle 106A), over-speeding information of the vehicle (for example, the first vehicle 106A), lane-changing information of the vehicle (for example, the first vehicle 106A), driving behavior of a driver of the vehicle (for example, the first vehicle 106A), vehicle occupancy information of the vehicle (for example, the first vehicle 106A), fuel efficiency information of the vehicle (for example, the first vehicle 106A), and engine tuning information of the vehicle (for example, the first vehicle 106A). The telematics data 608A may further include battery charging information of the vehicle (for example, the first vehicle 106A), battery health information of the vehicle (for example, the first vehicle 106A), tire pressure information of the vehicle (for example, the first vehicle 106A), and maintenance/service information of the vehicle (for example, the first vehicle 106A).

The OBD parameters of the vehicle (for example, the first vehicle 106A) may include, but is not limited to, a pedal position, an airflow rate, a coolant temperature, an emission readiness status, a number of ignition cycles, and a number of miles driven. The speed information of the vehicle (for example, the first vehicle 106A) may provide an information associated with the speed of the vehicle as measured by the speedometer of the vehicle. The acceleration and deacceleration information of the vehicle (for example, the first vehicle 106A) may include information associated with the acceleration and deacceleration of vehicle as measured by the accelerometer. The health status of the vehicle may provide a condition of the vehicle (for example, the first vehicle 106A). For example, the health status of the vehicle (for example, the first vehicle 106A) may provide information associated with a condition of the braking system 416 of the vehicle, a condition of wheels of the vehicle, a condition of the engine 408 of the vehicle, a condition of the steering system 414 of the vehicle, and the like. The road conditions related to the route of the vehicle (for example, the first vehicle 106A) may provide whether roads in the route of the vehicle are slippery, very slippery, slush, smooth, bumpy, very slippery, and the like. The weather conditions related to the route of the vehicle (for example, the first vehicle 106A) may state the weather of the route as determined by the weather sensor. For example, the weather conditions may be sunny, cloudy, partial cloudy, windy, and the like. The location information of the route of the vehicle (for example, the first vehicle 106A) may provide information associated with a geographical location of the route of the vehicle as determined by the location sensor. The tachometer information of the vehicle (for example, the first vehicle 106A) may provide information associated with the speed in rotations per minute of the engine 408 of the vehicle as measured by the tachometer. The over-speeding information of the vehicle (for example, the first vehicle 106A) may state whether the vehicle is over-speeding. For example, in case the speed of the vehicle as determined by the speedometer is above "100" kilometers per hour then the over-speeding information may state that the vehicle is over-speeding. The lane-changing information of the vehicle (for example, the first vehicle 106A) may state whether the vehicle is vehicle is changing lane or maintaining a lane. The lane-changing information may be determined based on the images captured by the imaging sensor. The driving behavior of the driver of the vehicle (for example, the first vehicle 106A) may be determined based on head rotations, eye-gaze dynamics, hand motions and gestures, body movements, and foot dynamics of the driver. The driving behavior may provide information whether the driver drives smoothly, keeps lane, maintains speed limit, concentrates on driving, and the like. The vehicle occupancy information of the vehicle may provide information associated with a number of persons occupying the vehicle (for example, the first vehicle 106A). The fuel efficiency information of the vehicle (for example, the first vehicle 106A) may provide information associated with a number of miles traversed by the vehicle in a certain amount of fuel. The engine tuning information of the vehicle (for example, the first vehicle 106A) may provide information associated an adjustment or modification of the engine that may need to be performed so that a performance of the engine of the vehicle is optimal. The battery charging information of the vehicle (for example, the first vehicle 106A) may state the SOC of the battery. Further, the battery charging information of the vehicle (for example, the first vehicle 106A) may state whether the battery is being charged. The batter health information of the vehicle (for example, the first vehicle 106A) may provide information associated with a performance of battery and a maximum amount of charge that the battery can hold. The tire pressure information of the vehicle (for example, the first vehicle 106A) may provide information associated with the pressure of the type of vehicle as measured by the pressure sensor. The maintenance/service information of the vehicle (for example, the first vehicle 106A) may provide information associated with a due date of maintenance/service information. Further, the maintenance/service information may state a date on which the vehicle (for example, the first vehicle 106A) was serviced in the past.

At 610, an operation of telematics data transmission may be executed. In an embodiment, the control circuitry (e.g., the ECU 404) may be configured to transmit the determined telematics data 608A associated with the vehicle (for example, the first vehicle 106A). Upon determination of the telematics data 608A, the vehicle (for example, the first vehicle 106A) may transmit the determined telematics data 608A associated with the corresponding vehicle to the system 104 that may be associated with the user 116.

In an embodiment, the control circuitry (e.g., the ECU 404) may be further configured to transmit, by the activated TCU 418, the determined telematics data 608A associated with the vehicle (for example, the first vehicle 106A) to the electronic device 102 associated with at least one of a manufacturer, a retailer, a dealer, a vendor, a service provider, an infrastructure provider, or a user associated with the vehicle (for example, the first vehicle 106A). Herein, the manufacturer may an entity or a person that may have manufactured the vehicle (for example, the first vehicle 106A). The retailer may be a person or an entity that may have sold the vehicle (for example, the first vehicle 106A) to a user such as, the user 116 of FIG. 1. The dealer may be a person or an entity that may initially purchase the vehicle (for example, the first vehicle 106A from manufacturers in bulk. A vendor may be an entity or person that may act as an intermediary between manufacturers and end users of the vehicle. The service provider may be an entity that may provide service of telematics data transmission from the vehicle (for example, the first vehicle 106A). An infrastructure provider be an entity that may provide an infrastructure for telematics data transmission from the vehicle (for example, the first vehicle 106A).

In an embodiment, the transmitted telematics data 608A may be used to generate a graphical representation of at least one of location information or energy demand information, associated with charging of electric vehicles. The electronic device 102 may analyze the transmitted telematics data 608A to generate a one or more graphs based on the transmitted telematics data. The electronic device 102 may generate the graphical representation of the location information by taking geographical locations of each vehicle of the set of vehicles 106 along a "first axis". Further, a number of vehicles may be taken along a "second axis". The number of vehicles of the set of vehicles 106 that lie in each geographical location may be plotted to generate the graphical representation of the location information. The electronic device 102 may generate the energy demand information, associated with charging of the electric vehicles by taking geographical locations of each vehicle of the set of vehicles 106 along a "first axis". Further, energy demands may be taken along a "second axis". An energy demand for each geographical location may be plotted to generate the graphical representation of the energy demand information, associated with charging of the electric vehicles. The graphical representation may provide insight on a number of charging stations that may be required in each geographical location. Higher the energy demand for a geographical location, higher may be a requirement of the charging stations.

At 612, an operation of rendering of the transmitted telematics data may be executed. In an embodiment, the control circuitry (e.g., the ECU 404) may be configured to control rendering of the transmitted telematics data 608A on the display device (for example, the display device 208A). In an embodiment, the transmitted telematics data 608A may be rendered on the display device of the vehicle (for example, the first vehicle 106A). In another embodiment, the transmitted telematics data 608A may be rendered on the display device 208A of the electronic device 102. In some embodiment, the graphical representation may be rendered on the display device (for example, the display device 208A of FIG. 2). The rendered telematics data 608A may be used to gain insights, such determination of energy demand for each geographical location. Further, the rendered telematics data 608A for determining the requirement of the number of charging stations for each geographical location. Based on the determined requirement of the number of charging stations for each geographical location, a plan of setting up charging stations for each geographical location may be determined.

The disclosed system (i.e., the control circuitry of the ECU 404 of the first vehicle 106A) may thus, activate the TCU 418 only when the battery 410 is charged to the threshold value. Further, when the vehicle (for example, the first vehicle 106A) is not charging, then vehicle may be assumed to be shut off and the TCU 418 may be turned off. The battery 410 associated with each vehicle (for example, the first vehicle 106A) may be saved by allowing the corresponding vehicle (for example, the first vehicle 106A) to turn on and turn off the corresponding TCU 418. Further, the generation of the graphical representation based on the transmitted telematics data 608A may allow the urban planner to execute a plan of setting up of the EVSEs in each geographical location. An example scenario for the vehicle-battery SOC-based transmission of telematics data is described, for example, in FIG. 7.

Figure 7:
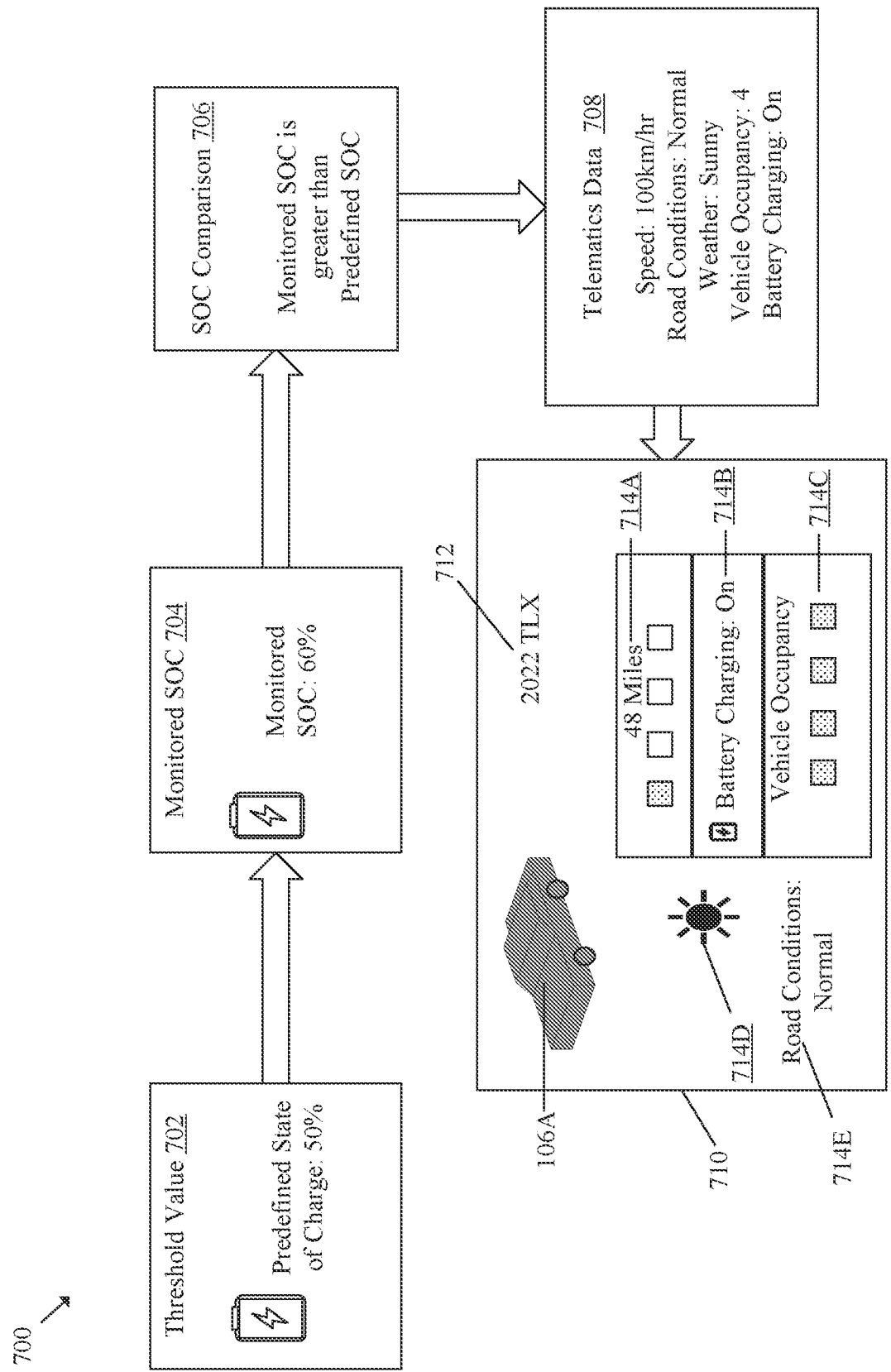
FIG. 7 is a diagram that illustrates an exemplary scenario for vehicle-battery SOC-based transmission of telematics data, in accordance with an embodiment of the disclosure.

FIG. 7 is a diagram that illustrates an exemplary scenario for vehicle-battery SOC-based transmission of telematics data, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown an exemplary scenario 700 for vehicle-battery SOC-based transmission of telematics data. The scenario 700 includes a threshold value 702, a monitored SOC 704, telematics data 708, and a user interface (UI) 710. The UI 710 may be displayed on a display device, such as, the display device 208A. The UI 710 may include a UI element 712, a UI element 714A, a UI element 714B, a UI element 714C, and a UI element 714D, and a UI element 714E. The scenario 700 further includes an operation 706 that may be executed by the control circuitry or the ECU 404 of FIG. 4. A set of operations associated with the scenario 700 is described herein.

With reference to FIG. 7, for example, the threshold value 702 may indicate that the predefined SOC of a battery (for example, the battery 410) of a vehicle (e.g., the first vehicle 106A) may be required to be at least "50" percent for monitoring and collecting telematics data from the vehicle. In one scenario, the monitored SOC 704 of the battery may be "60" percent. At 706, the monitored SOC 704 of the battery 410 may be compared with the predefined SOC. For example, in the current scenario, the control circuitry (e.g., the ECU 404) may determine that the monitored SOC 704 of the battery 410 may be higher than the predefined SOC. The control circuitry (e.g., the ECU 404) may determine the telematics data 708, as the monitored SOC 704 exceeds the predefined SOC (i.e., the threshold value 702).

In an example, the telematics data 708 may indicate that the speed of vehicle (for example, the first vehicle 106A) as "100" kilometers per hour. Further, the telematics data 708 may indicate that the road conditions of the route of the vehicle (for example, the first vehicle 106A) as "normal". Further, the telematics data 708 may indicate that the weather of the route of the vehicle (for example, the first vehicle 106A) as "sunny". The telematics data 708 may also indicate that the vehicle occupancy of the vehicle (for example, the first vehicle 106A) as "4" passengers. The telematics data 708 may also indicate that the battery (for example, the battery 410) of the vehicle (for example, the first vehicle 106A) is being charged. The determined telematics data 708 may be transmitted to the electronic device 102. The electronic device 102 may render the transmitted telematics data 708 on the display device 208A.

For example, herein, the UI element 712 may indicate that a model number of the vehicle (for example, the first vehicle 106A) may be "2022 TLX". The UI element 714A may indicate that the speed of vehicle may be "100" kilometers per hour. The UI element 714B may indicate that the battery (for example, the battery 410) of the vehicle (for example, the first vehicle 106A) is being charged. The UI element 714C may indicate that the vehicle occupancy of the vehicle (for example, the first vehicle 106A) is "4". The UI element 714D may indicate that the weather of the route of the vehicle (for example, the first vehicle 106A) is "sunny". The UI element 714E may indicate that the road conditions of the route of the vehicle (for example, the first vehicle 106A) is "normal".

It should be noted that the scenario 700 of FIG. 7 is for exemplary purposes and should not be construed to limit the scope of the disclosure.

Figure 8:
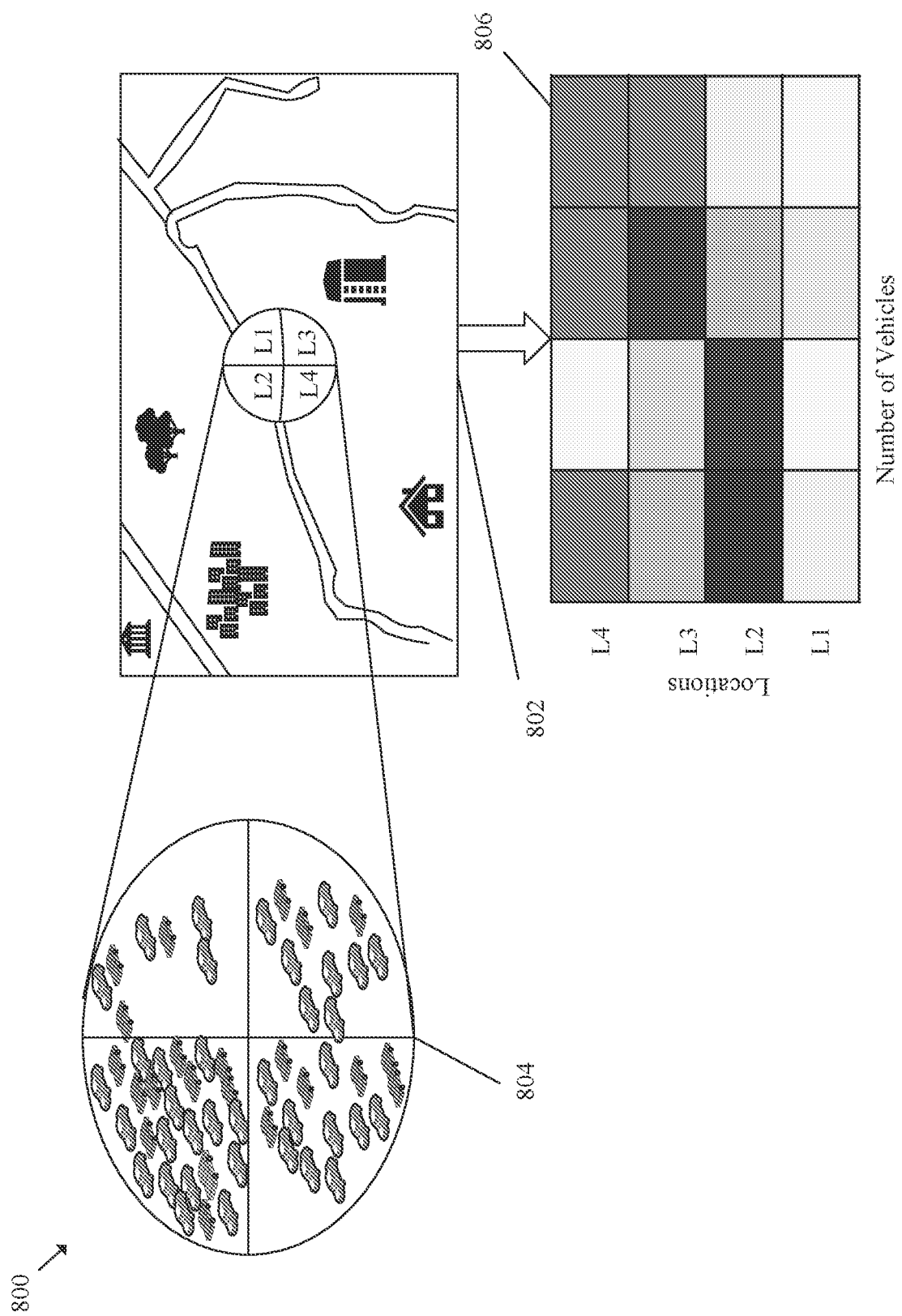
FIG. 8 is a diagram that illustrates an exemplary scenario of heat map generation, in accordance with an embodiment of the disclosure.

FIG. 8 is a diagram that illustrates an exemplary scenario of heat map generation, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown an exemplary scenario 800 for heat map generation. The scenario 800 includes a map 802 of a geographical area, a set of geographical locations 804, and a heat map 806. The set of geographical locations 804 may include a geographical location "L1", a geographical location "L2", a geographical location "L3", and a geographical location "L4". A set of operations associated with the scenario 800 is described herein.

With reference to FIG. 8, for example, there is shown the map 802 of a geographical area. A portion of the map 802 is enlarged to depict the set of geographical locations 804. Each geographical location of the set of geographical locations 804 may include a certain number of vehicles (for example, the first vehicle 106A). A density of vehicles per square kilometer for each geographical location of the set of geographical locations 804 may be determined. Thereafter, the heat map 806 may be generated by the "density of vehicles per square kilometer" along a first axis (e.g., an X-axis) and the set of geographical locations 804 along a second axis (e.g., a Y-axis). Herein, the density of vehicles per square kilometer may be color coded. A darker shade in the heat map 806 for any geographical location of the set of geographical locations 804 may represent a higher density of vehicles per square kilometer for the corresponding geographical location. A lighter shade in the heat map 806 for any geographical location of the set of geographical locations 804 may represent a lower density of vehicles per square kilometer for the corresponding geographical location. The heat map 806 may be rendered on the display device 308A.

In an example, an urban planner, such as the user 116, associated with the system 104 may analyze the rendered heat map 806 to determine the requirement of the number of charging stations for each geographical location of the set of geographical locations 804 based on the rendered heat map 806. The higher the "density of vehicles per square kilometer" for a "geographical location" of the set of geographical locations 804, the higher may be the requirement of the number of charging stations for the corresponding geographical location of the set of geographical locations 804. Based on the determined requirement of the number of charging stations for each geographical location of the set of geographical locations 804, the charging stations may be set up in each geographical location of the set of geographical locations 804.

It should be noted that the scenario 800 of FIG. 8 is for exemplary purposes and should not be construed to limit the scope of the disclosure.

Figure 9A:
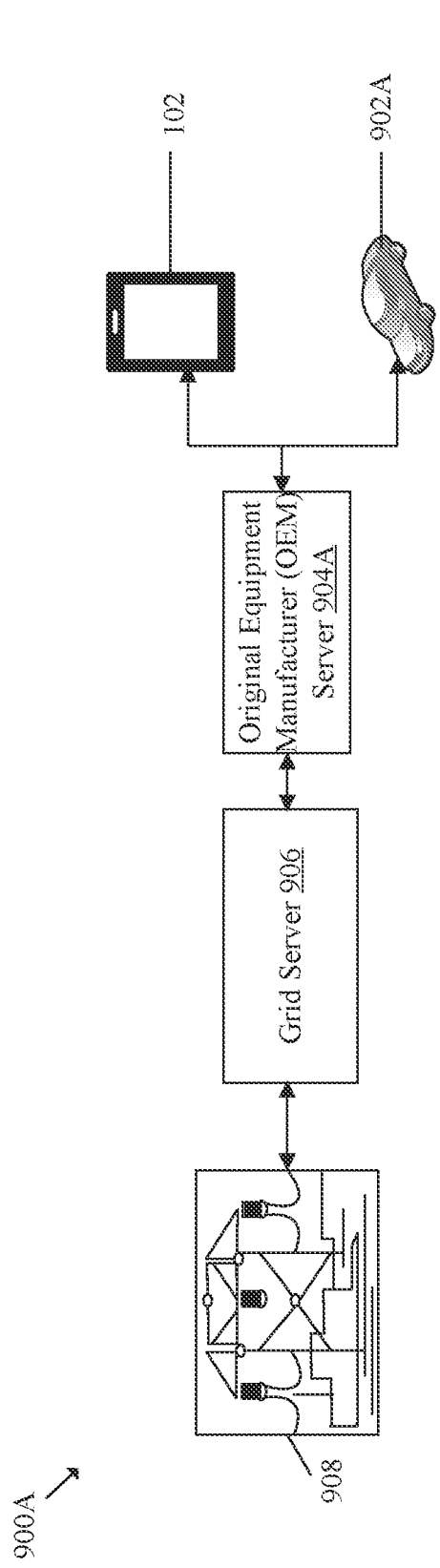
FIG. 9A is a diagram that illustrates an exemplary scenario for transmission of telematics data from a vehicle, in accordance with an embodiment of the disclosure.

FIG. 9A is a diagram that illustrates an exemplary scenario for transmission of telematics data from a vehicle, in accordance with an embodiment of the disclosure. FIG. 9A is explained in conjunction with elements from FIG. 1, FIG. 2, FIG. 3, FIG. 4, FIG. 5, FIG. 6, FIG. 7, and FIG. 8. With reference to FIG. 9A, there is shown an exemplary scenario 900A for transmission of telematics data from a vehicle. The scenario 900A includes a vehicle 902A, the electronic device 102 that may be associated with the vehicle 902A, an original equipment manufacturer (OEM) server 904A, a grid server 906, and an electricity grid network 908.

With reference to FIG. 9A, the OEM server 904A may be associated with a manufacturer of the vehicle 902A. In an embodiment, the OEM server 904A may be associated with one or more of a retailer, a dealer, a vendor, a service provider, an infrastructure provider, or a manufacturer, of vehicles of a certain company or group of companies. With reference to FIG. 9A, the OEM server 904A may include suitable logic, control circuitry, and interfaces, and/or code that may be configured to receive the telematics data associated with the vehicles that may have been manufactured by a common manufacturer. Further, the OEM server 904A may be configured to transmit the received telematics data to the grid server 906.

With reference to FIG. 9A, the grid server 906 may receive the telematics data (such as, the telematics data 608A of FIG. 6) associated with the vehicle 902A, which may transmit the telematics data based on a state-of-charge of a battery of the vehicle 902A. Thereafter, the OEM server 904A may upload the received telematics data on the grid server 906 at predefined time intervals. Details related to the determination of the telematics data are further provided, for example, in FIG. 6 (at 608).

The grid server 906 may include suitable logic, control circuitry, and interfaces, and/or code that may be configured to receive telematics data from the OEM server 904A. With reference to FIG. 9A, the telematics data associated with the vehicle 902 may be uploaded on the grid server 906 at the predefined time intervals. The grid server 906 may analyze the telematics data received from each vehicle, such as the vehicle 902, to determine statistical information associated with the telematics data corresponding to a plurality of vehicles. Further, the grid server 906 may transmit the determined statistical to the electricity grid network 908.

The electricity grid network 908 may include suitable logic, control circuitry, and interfaces, and/or code that may be configured to provide electricity from one or more electricity producers (such as, power plants) to one or more consumers (such as, distribution stations of cities, residential establishments, commercial establishments, industries, etc. In an embodiment, the electricity grid network 908 may provide an amount of electricity to each EVSE present in a geographical location. The electricity grid network 908 may receive the statistical information determined based on the analysis of the telematics data from the grid server 906. Further, the electricity grid network 908 may allocate electricity to EVSEs based on the received statistical information. In some cases, the electricity grid network 908 may estimate a demand of EVSEs in the geographical location based on the received statistical information. The estimated demand of EVSEs in the geographical location may be used to plan installation of EVSEs in the geographical location.

It should be noted that the scenario 900A of FIG. 9A is for exemplary purposes and should not be construed to limit the scope of the disclosure.

Figure 9B:
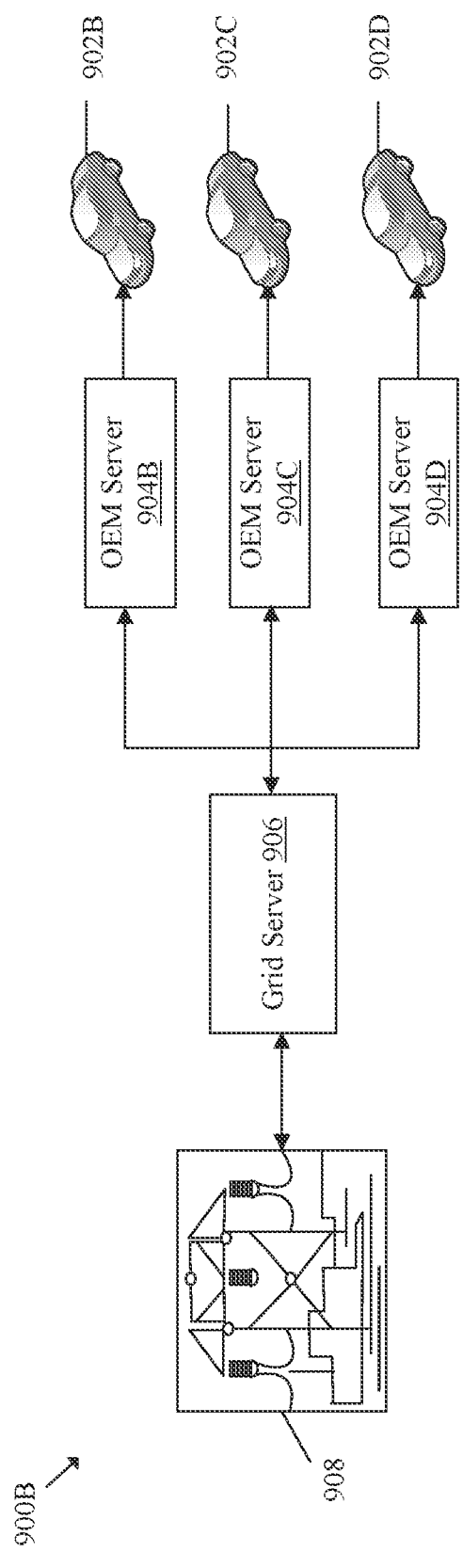
FIG. 9B is a diagram that illustrates an exemplary scenario for transmission of telematics data from a set of vehicles, in accordance with an embodiment of the disclosure.

FIG. 9B is a diagram that illustrates an exemplary scenario for transmission of telematics data from a set of vehicles, in accordance with an embodiment of the disclosure. FIG. 9B is explained in conjunction with elements from FIG. 1, FIG. 2, FIG. 3, FIG. 4, FIG. 5, FIG. 6, FIG. 7, FIG. 8, and FIG. 9A. With reference to FIG. 9B, there is shown an exemplary scenario 900B for transmission of telematics data from a set of vehicles. The scenario 900B includes a vehicle 902B, a vehicle 902C, a vehicle 902D, an OEM server 904B, an OEM server 904C, and an OEM server 904D, the grid server 906, and the electricity grid network 908.

With reference to FIG. 9B, the OEM server 904B may be associated with a manufacturer of the vehicle 902B. Further, the OEM server 904C may be associated with a manufacturer of the vehicle 902C, and the OEM server 904D may be associated with a manufacturer of the vehicle 902D. The functions of the OEM server 904B, the OEM server 904C, and the OEM server 904D may be same as the functions of the OEM server 904A described, for example, in FIG. 9A. Therefore, the description of the OEM server 904B, the OEM server 904C, and the OEM server 904D is omitted from the disclosure for the sake of brevity.

With reference to FIG. 9B, the OEM server 904B may receive the telematics data associated with the vehicle 902B. Further, the OEM server 904C may receive the telematics data associated with the vehicle 902C and the OEM server 904D may receive the telematics data associated with the vehicle 902D. Thereafter, the OEM server 904B, the OEM server 904C, and the OEM server 904D may upload the respective received telematics data to the grid server 906 at the predefined time intervals. Details related to the determination of the telematics data are further provided, for example, in FIG. 5 (at 508).

It should be noted that each OEM server may be associated with a different vehicle manufacturer. In another scenario, two or more OEM servers may be associated with the same vehicle manufacturers. The telematics data received by each OEM server may have different data formats based on the manufacturer that may be associated with the corresponding OEM server and the corresponding vehicles. For example, the telematics data received from the vehicle 902B of a manufacturer-1 may be of a first data format, while the telematics data received from the vehicle 902C of a manufacturer-2 may be of a second (i.e., different) data format. The OEM server (e.g., the OEM server 904B) of each manufacturer may be configured to convert the data format of the received telematics data to a data format that may be compatible with data formats used by the grid server 906. Thus, in the above example, the OEM server 904B and the OEM server 904C may convert the corresponding received telematics data from the first data format and the second data format, respectively, to an industry-standard data format compatible with the grid server 906. In a non-limiting example, such industry-standard data format may be an Open Vehicle-Grid Integration Platform (OVGIP) standard.

The grid server 906 may receive the telematics data associated with the vehicle 902B, the telematics data associated with the vehicle 902C, the telematics data associated with the vehicle 902D from the OEM server 904B, the OEM server 904C, and the OEM server 904D, respectively. In some cases, the grid server 906 may analyze the telematics data received from each vehicle to determine the statistical information related to the analyzed telematics data. Thereafter, the grid server 906 may transmit the determined statistical information to the electricity grid network 908. Details related to the determination of the statistical information are further provided, for example, in FIG. 5 (at 512)

The electricity grid network 908 may receive the determined statistical information from the grid server 906. The electricity grid network 908 may provide an amount of electricity to each EVSE present in the geographical location based on the received statistical information. In some cases, the electricity grid network 908 may determine the demand of EVSEs in the geographical location based on the received statistical information. The determined demand of EVSEs in the geographical location may be employed to plan installation of EVSEs in the geographical location.

It should be noted that the scenario 900B of FIG. 9B is for exemplary purposes and should not be construed to limit the scope of the disclosure.

Figure 10:
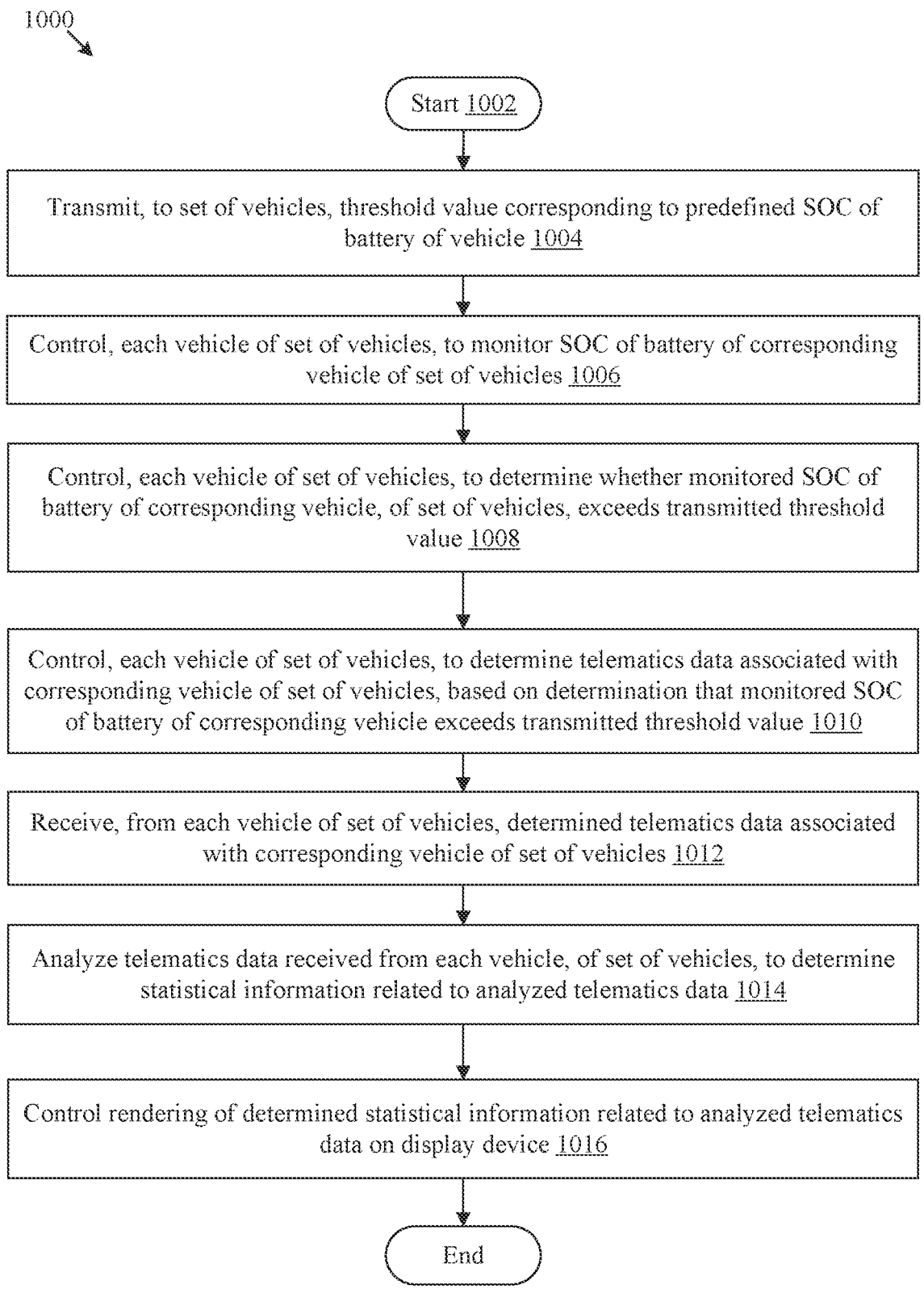
FIG. 10 is a flowchart that illustrates exemplary operations of a method for determination of statistical information based on telematics data associated with each vehicle of a set of vehicles, in accordance with an embodiment of the disclosure.

FIG. 10 is a flowchart that illustrates exemplary operations of a method for determination of statistical information based on telematics data associated with each vehicle of a set of vehicles, in accordance with an embodiment of the disclosure. With reference to FIG. 10, there is shown a flowchart 1000. The flowchart 1000 is described in conjunction with FIG. 1, FIG. 2, FIG. 3, FIG. 4, FIG. 5, FIG. 6, FIG. 7, FIG. 8, FIG. 9A, and FIG. 9B. The operations from 1002 to 1016 may be implemented, for example, by the control circuitry 302 of the system 104 of FIG. 3. The operations of the flowchart 1000 may start at 1002 and proceed to 1004.

At 1004, the threshold value 502A corresponding to the predefined state-of-charge of the battery (for example, the battery 410) of the vehicle (for example, the first vehicle 106A) may be transmitted to the set of vehicles 106. In an embodiment, the control circuitry 302 may be configured to transmit the threshold value 502A corresponding to the predefined state-of-charge of the battery (for example, the battery 410) of the vehicle (for example, the first vehicle 106A) to the set of vehicles 106. Details related to the transmission of the predefined SOC of the battery are provided, for example, in FIG. 5 (at 502).

At 1006, each vehicle of the set of vehicles 106 may be controlled to monitor the SOC of the battery (for example, the battery 410 of FIG. 4) of the corresponding vehicle (for example, the first vehicle 106A) of the set of vehicles 106. In an embodiment, the control circuitry 302 may be configured to control, each vehicle (for example, the first vehicle 106A) of the set of vehicles 106, to monitor the SOC of the battery (for example, the battery 410 of FIG. 4) of the corresponding vehicle of the set of vehicles 106. Details related to the monitoring of the SOC are further provided, for example, in FIG. 5 (at 504).

At 1008, each vehicle of the set of vehicles 106 may be controlled to determine whether the monitored SOC of the battery (for example, the battery 410) of each vehicle (for example, the first vehicle 106A), of the set of vehicles 106, exceeds the transmitted threshold value 502A. In an embodiment, the control circuitry 302 may be configured to control, each vehicle (for example, the first vehicle 106A) of the set of vehicles 106, to determine whether the monitored SOC of the battery (for example, the battery 410) of the corresponding vehicle (for example, the first vehicle 106A), of the set of vehicles 106, exceeds the transmitted threshold value 502A. Details related to determination of whether the monitored SOC of the battery of each vehicle exceeds the transmitted threshold value are further provided, for example, in FIG. 5 (at 506).

At 1010, each vehicle of the set of vehicles 106 may be controlled to determine telematics data associated with the corresponding vehicle (for example, the first vehicle 106A) of the set of vehicles 106. In an embodiment, the control circuitry 302 may be configured to control, each vehicle of the set of vehicles 106, to determine the telematics data associated with the corresponding vehicle (for example, the first vehicle 106A) of the set of vehicles 106, based on the determination that the SOC of the battery (for example, the battery 410) of the corresponding vehicle exceeds the transmitted threshold value 502A. Details related to the determination of the telematics data are further provided, for example, in FIG. 5 (at 508).

At 1012, the determined telematics data associated with each vehicle (for example, the first vehicle 106A) of the set of vehicles 106 may be received from the corresponding vehicle (for example, the first vehicle 106A) of the set of vehicles 106. In an embodiment, the control circuitry 302 may be configured to receive, from each vehicle (for example, the first vehicle 106A) of the set of vehicles 106, the determined telematics data associated with the corresponding vehicle (for example, the first vehicle 106A) of the set of vehicles 106. Details related to the reception of the telematics data are further provided, for example, in FIG. 5 (at 510).

At 1014, the telematics data received from each vehicle (for example, the first vehicle 106A) of the set of vehicles 106 may be analyzed to determine statistical information related to the analyzed telematics data. In an embodiment, the control circuitry 302 may be configured to analyze the telematics data received from each vehicle (for example, the first vehicle 106A), of the set of vehicles 106, to determine statistical information related to the analyzed telematics data. Details related to the determination of the statistical information are further provided, for example, in FIG. 5 (at 512).

At 1016, the determined statistical information related to the analyzed telematics data may be rendered on the display device (for example, the display device 308A). In an embodiment, the control circuitry 302 may be configured to control rendering of the determined statistical information related to the analyzed telematics data on the display device (for example, the display device 308A). Details related to the rendering of the determined statistical information are further provided, for example, in FIG. 5 (at 514). Control may pass to end.

Although the flowchart 1000 is illustrated as discrete operations, such as 1002, 1004, 1006, 1008, 1010, 1012, 1014, and 1016 the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 11:
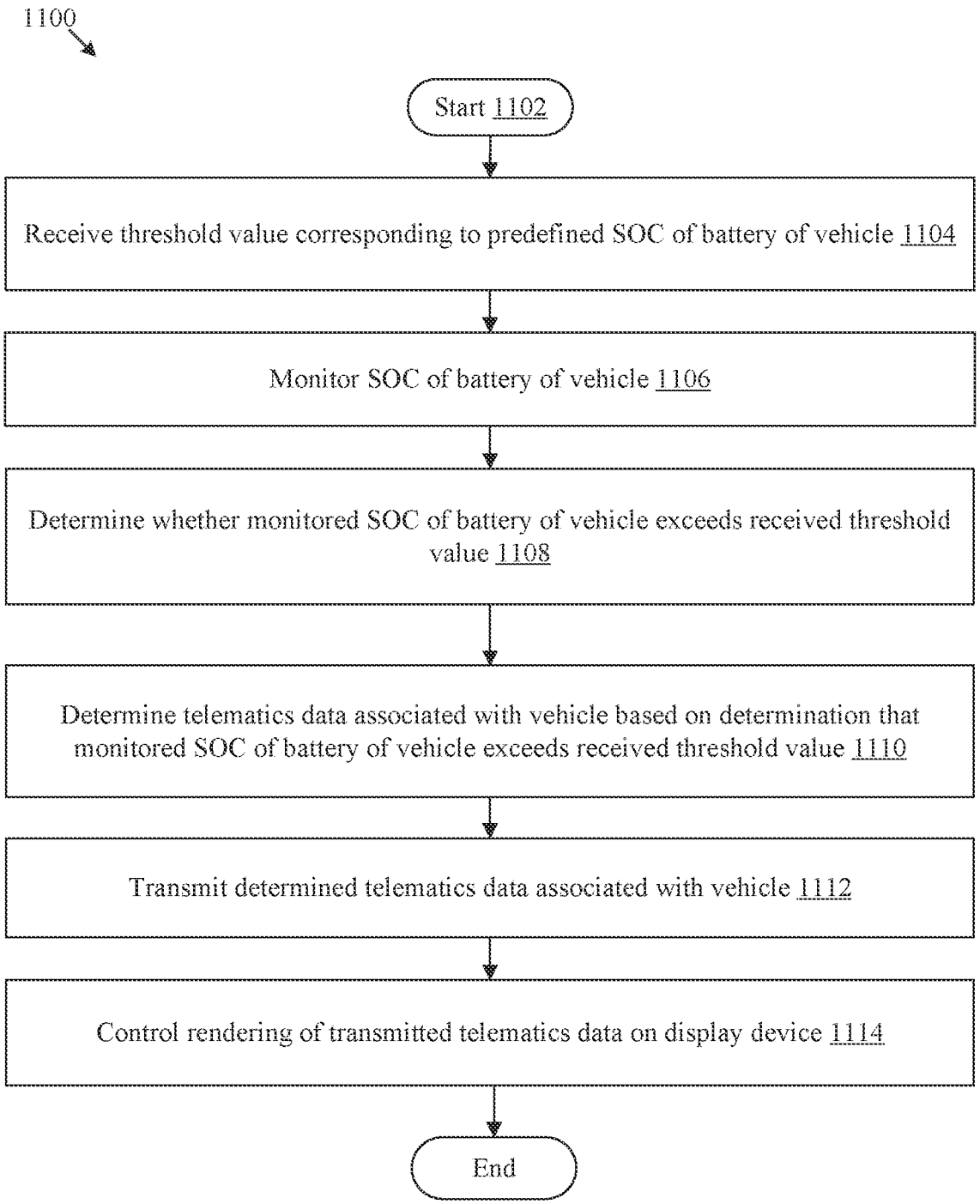
FIG. 11 is a flowchart that illustrates exemplary operations of a method for vehicle-battery SOC-based transmission of telematics data, in accordance with an embodiment of the disclosure.

FIG. 11 is a flowchart that illustrates exemplary operations of a method for vehicle-battery state-of-charge (SOC)-based transmission of telematics data, in accordance with an embodiment of the disclosure. With reference to FIG. 11, there is shown a flowchart 1100. The flowchart 1100 is described in conjunction with FIG. 1, FIG. 2, FIG. 3, FIG. 4, FIG. 5, FIG. 6, FIG. 7, FIG. 8, FIG. 9A, FIG. 9B, and FIG. 10. The operations from 1102 to 1114 may be implemented, for example, by the control circuitry or electronic control unit 404 of the first vehicle 106A of FIG. 4. The operations of the flowchart 1100 may start at 1102 and proceed to 1104.

At 1104, the threshold value 602A corresponding to the predefined SOC of the battery (for example, the battery 410) of the vehicle (for example, the first vehicle 106A) may be received. In an embodiment, the control circuitry (e.g., the ECU 404) may be configured to receive the threshold value 602A corresponding to the predefined SOC of the battery (for example, the battery 410) of the vehicle (for example, the first vehicle 106A). Details related to the reception of the predefined SOC of the battery are provided, for example, in FIG. 6 (at 602).

At 1106, the SOC of the battery (for example, the battery 410) of the vehicle (for example, the first vehicle 106A) may be monitored. In an embodiment, the control circuitry (e.g., the ECU 404) may be configured to monitor the SOC of the battery (for example, the battery 410) of the vehicle (for example, the first vehicle 106A). Details related to the monitoring the SOC of the battery are provided, for example, in FIG. 6 (at 604).

At 1108, whether the monitored SOC of the battery (for example, the battery 410) of the vehicle (for example, the first vehicle 106A) exceeds the received threshold value 602A may be determined. In an embodiment, the control circuitry (e.g., the ECU 404) may be configured to determine whether the monitored SOC of the battery (for example, the battery 410) of the vehicle (for example, the first vehicle 106A) exceeds the received threshold value 602A. Details related to the SOC comparison are provided, for example, in FIG. 6 (at 606).

At 1110, the telematics data 608A associated with the vehicle (for example, the first vehicle 106A) may be determined based on the determination that the monitored SOC of the battery (for example, the battery 410) of the vehicle (for example, the first vehicle 106A exceeds the received threshold value 602A. In an embodiment, the control circuitry (e.g., the ECU 404) may be configured to determine the telematics data 608A associated with the vehicle (for example, the first vehicle 106A) based on the determination that the monitored SOC of the battery (for example, the battery 410) of the vehicle (for example, the first vehicle 106A exceeds the received threshold value 602A. Details related to the telematics data determination are provided, for example, in FIG. 6 (at 608).

At 1112, the determined telematics data 608A associated with the vehicle (for example, the first vehicle 106A) may be transmitted. In an embodiment, the control circuitry (e.g., the ECU 404) may be configured to transmit the determined telematics data 608A associated with the vehicle (for example, the first vehicle 106A). Details related to the transmission of the predefined telematics data are provided, for example, in FIG. 6 (at 610).

At 1114, the transmitted telematics data 608A may be rendered on the display device (for example, the display device 208A of FIG. 2). In an embodiment, the control circuitry may be configured to control rendering of the transmitted telematics data 608A on the display device (for example, the display device 208A of FIG. 2). Details related to the rendering of the transmitted telematics data are provided, for example, in FIG. 7. Control may pass to end.

Although the flowchart 1100 is illustrated as discrete operations, such as 1102, 1104, 1106, 1108, 1110, 1112, and 1114 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (such as, the control circuitry 302). The instructions may cause the machine and/or computer (for example, the system 104) to perform operations that may include transmission, to the set of vehicles (for example, the set of vehicles 106), the threshold value 502A (for example, the threshold value 502A) corresponding to the predefined state-of-charge of the battery (for example, the battery 410) of the vehicle (for example, the first vehicle 106A). The operations may further include controlling, each vehicle (for example, the first vehicle 106A) of the set of vehicles, to monitor the state-of-charge of the battery (for example, the battery 410) of the corresponding vehicle of the set of vehicles (for example, the set of vehicles 106). The operations may further include controlling, each vehicle (for example, the first vehicle 106A) of the set of vehicles (for example, the set of vehicles 106), to determine whether the monitored state-of-charge of the battery (for example, the battery 410) of the corresponding vehicle, of the set of vehicles (for example, the set of vehicles 106), exceeds the transmitted threshold value (for example, the threshold value 502A). The operations may further include controlling, each vehicle (for example, the first vehicle 106A) of the set of vehicles (for example, the set of vehicles 106), to determine telematics data associated with the corresponding vehicle of the set of vehicles (for example, the set of vehicles 106), based on the determination that the monitored state-of-charge of the battery (for example, the battery 410) of the corresponding vehicle exceeds the transmitted threshold value (for example, the threshold value 502A). The operations may further include receiving, from each vehicle (for example, the first vehicle 106A) of the set of vehicles (for example, the set of vehicles 106), the determined telematics data associated with the corresponding vehicle of the set of vehicles (for example, the set of vehicles 106). The operations may further include analyzing the telematics data received from each vehicle (for example, the first vehicle 106A), of the set of vehicles (for example, the set of vehicles 106), to determine statistical information related to the analyzed telematics data. The operations may further include control rendering of the determined statistical information related to the analyzed telematics data on the display device (for example, display device 308A of FIG. 2).

Various embodiments of the disclosure may provide a non-transitory, computer-readable medium and/or storage medium, and/or a non-transitory machine readable medium and/or storage medium stored thereon, a set of instructions executable by a machine and/or a computer (such as, the control circuitry of the first vehicle 106A). The instructions may cause the machine and/or computer (for example, the system 104) to perform operations that include receiving the threshold value 602A corresponding to the predefined SOC of the battery (for example, the battery 410) of the vehicle (for example, the first vehicle 106A). The operations may further include monitoring the SOC of the battery (for example, the battery 410) of the vehicle (for example, the first vehicle 106A). The operations may further include determining whether the monitored SOC of the battery (for example, the battery 410) of the vehicle (for example, the first vehicle 106A) exceeds the received threshold value 602A. The operations may further include determining the telematics data 608A associated with the vehicle (for example, the first vehicle 106A) based on the determination that the monitored SOC of the battery (for example, the battery 410) of the vehicle (for example, the first vehicle 106A exceeds the received threshold value 602A. The operations may further include transmitting the determined telematics data 608A associated with the vehicle (for example, the first vehicle 106A). The operations may further include rendering of the transmitted telematics data 608A on the display device (for example, the display device 208A of FIG. 2).

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A system, comprising:
control circuitry associated with a set of vehicular sensors and a telematics control unit (TCU) associated with a vehicle, the control circuitry configured to:
receive a threshold value corresponding to a predefined state-of-charge of a battery of the vehicle;
monitor a state-of-charge of the battery of the vehicle;
determine whether the monitored state-of-charge of the battery of the vehicle exceeds the received threshold value;
determine telematics data associated with the vehicle based on the determination that the monitored state-of-charge of the battery of the vehicle exceeds the received threshold value;
transmit the determined telematics data associated with the vehicle;
control rendering of the transmitted telematics data on a display device; and
deactivate the TCU associated with vehicle when the vehicle is switched off and not charging.

2. The system according to claim 1, wherein the control circuitry is further configured to:
determine whether the vehicle is connected to a charging station and is being charged at the charging station, wherein
the state-of-charge of the vehicle is monitored based on the determination that the vehicle is connected to the charging station and is being charged at the charging station.

3. The system according to claim 1, wherein the telematics data associated with the vehicle corresponds to at least one of:
on-board diagnostic data (OBD) parameters of the vehicle,
speed information of the vehicle,
acceleration and deacceleration information of the vehicle,
a health status of the vehicle,
road conditions related to a route of the vehicle,
weather conditions related to the route of the vehicle,
location information of the route of the vehicle,
tachometer information of the vehicle,
over-speeding information of the vehicle,
lane-changing information of the vehicle,
driving behavior of a driver of the vehicle,
vehicle occupancy information of the vehicle,
fuel efficiency information of the vehicle,
engine tuning information of the vehicle,
battery charging information of the vehicle,
batter health information of the vehicle,
tire pressure information of the vehicle, or
maintenance/service information of the vehicle.

4. The system according to claim 1, wherein the control circuitry is further configured to activate the TCU associated with the vehicle based on the determination that the monitored state-of-charge of the battery of the vehicle exceeds the received threshold value.

5. The system according to claim 4, wherein the control circuitry is further configured to:
monitor, by the set of vehicular sensors, sensor information associated with vehicle over a period of time; and
determine, by the activated TCU, the telematics data associated with the vehicle based on the activation of the TCU and the monitored sensor information associated with the vehicle.

6. The system according to claim 4, wherein the control circuitry is further configured to transmit, by the activated TCU, the determined telematics data associated with the vehicle to an electronic device associated with at least one of a manufacturer, a retailer, a dealer, a vendor, a service provider, an infrastructure provider, or a user associated with the vehicle.

7. The system according to claim 1, wherein the transmitted telematics data is used to generate a graphical representation of at least one of location information or energy demand information, associated with charging of electric vehicles.

8. A method, comprising:
in a system:
receiving a threshold value corresponding to a predefined state-of-charge of a battery of a vehicle;
monitoring a state-of-charge of the battery of the vehicle;
determining whether the monitored state-of-charge of the battery of the vehicle exceeds the received threshold value;
determining telematics data associated with the vehicle based on the determination that the monitored state-of-charge of the battery of the vehicle exceeds the received threshold value;
transmitting the determined telematics data associated with the vehicle;
controlling rendering of the transmitted telematics data on a display device; and
deactivating a telematics control unit (TCU) associated with the vehicle when the vehicle is switched off and not charging.

9. The method according to claim 8, further comprising:
determining whether the vehicle is connected to a charging station and is being charged at the charging station, wherein the state-of-charge of the vehicle is monitored based on the determination that the vehicle is connected to the charging station and is being charged at the charging station.

10. The method according to claim 8, wherein the telematics data associated with the vehicle corresponds to at least one of:
on-board diagnostic data (OBD) parameters of the vehicle,
speed information of the vehicle,
acceleration and deacceleration information of the vehicle,
a health status of the vehicle,
road conditions related to a route of the vehicle,
weather conditions related to the route of the vehicle,
location information of the route of the vehicle,
tachometer information of the vehicle,
over-speeding information of the vehicle,
lane-changing information of the vehicle,
driving behavior of a driver of the vehicle,
vehicle occupancy information of the vehicle,
fuel efficiency information of the vehicle,
engine tuning information of the vehicle,
battery charging information of the vehicle,
batter health information of the vehicle,
tire pressure information of the vehicle, or
maintenance/service information of the vehicle.

11. The method according to claim 8, wherein the vehicle includes a set of vehicular sensors and the TCU.

12. The method according to claim 11, further comprising activating the TCU associated with the vehicle based on the determination that the monitored state-of-charge of the battery of the vehicle exceeds the received threshold value.

13. The method according to claim 12, further comprising:
monitoring, by the set of vehicular sensors, sensor information associated with vehicle over a period of time; and
determining, by the activated TCU, the telematics data associated with the vehicle based on the activation of the TCU and the monitored sensor information associated with the vehicle.

14. The method according to claim 12, further comprising transmitting, by the activated TCU, the determined telematics data associated with the vehicle to an electronic device associated with at least one of a manufacturer, a retailer, a dealer, a vendor, a service provider, an infrastructure provider, or a user associated with the vehicle.

15. The method according to claim 8, wherein the transmitted telematics data is used to generate a graphical representation of at least one of location information or energy demand information, associated with charging of electric vehicles.

* * * * *